(12) United States Patent
Maekawa et al.

(10) Patent No.: US 8,841,804 B2
(45) Date of Patent: Sep. 23, 2014

(54) ELECTRIC MOTOR WITH OIL TEMPERATURE SENSOR AND COIL TEMPERATURE SENSOR, AND VEHICLE DRIVE DEVICE USING SUCH ELECTRIC MOTOR

(75) Inventors: Yuki Maekawa, Kariya (JP); Hiroyuki Nagata, Obu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 314 days.

(21) Appl. No.: 13/288,483

(22) Filed: Nov. 3, 2011

(65) Prior Publication Data
US 2012/0112581 A1 May 10, 2012

(30) Foreign Application Priority Data

Nov. 4, 2010 (JP) ................... 2010-247718

(51) Int. Cl.
*H02K 11/00* (2006.01)
(52) U.S. Cl.
USPC .......................................... 310/71; 310/68 C
(58) Field of Classification Search
USPC ............... 310/71, 68 C, 68 B, 68 E
IPC ...................................................... H02K 11/00
See application file for complete search history.

(56) References Cited

U.S. PATENT DOCUMENTS

| 7,211,912 | B2 * | 5/2007 | Takenaka et al. | 310/52 |
| 7,557,478 | B2 * | 7/2009 | Hoshika | 310/71 |
| 2010/0244597 | A1 * | 9/2010 | Sugiyama et al. | 310/71 |
| 2012/0111145 | A1 * | 5/2012 | Maekawa et al. | 310/71 |

FOREIGN PATENT DOCUMENTS

| JP | 60-163329 | U |   | 10/1985 |   |
| JP | 2001-25198 | A |   | 1/2001 |   |
| JP | 2009-100538 | A |   | 5/2009 |   |
| JP | 2010141962 | A | * | 6/2010 | ............ H02K 11/00 |
| JP | 2010-213544 | A |   | 9/2010 |   |
| JP | 2010-233405 | A |   | 10/2010 |   |

OTHER PUBLICATIONS

Machine translation of JP2010-141962 (published Jun. 24, 2010, translated Jul. 15, 2013).*
Office Action issued on Jul. 29, 2014, by the Japan Patent Office in corresponding Japanese Patent Application No. 2010-247718 and an English translation of the Office Action. (5 pages).

* cited by examiner

*Primary Examiner* — Michael Andrews
(74) *Attorney, Agent, or Firm* — Buchanan Ingersoll & Rooney PC

(57) ABSTRACT

An electric motor and a vehicle drive device having the same are provided. The electric motor includes a core unit having plural core assemblies, each being wound with a coil; an bus ring; plural supporting members having terminal accommodating portions; and an attachment member which includes at least one of a first holding portion for holding a first sensor for measuring a temperature of an oil stored in the case and a second holding portion for holding a second sensor for measuring a temperature of the coils at a predetermined second position. The attachment member is fixed to one of the supporting members such that the first or the second sensor is positioned at a corresponding one of the first position and the second position between adjacent terminal accommodating portions.

8 Claims, 19 Drawing Sheets

ELECTRIC MOTOR WITH OIL TEMPERATURE SENSOR AND COIL TEMPERATURE SENSOR, AND VEHICLE DRIVE DEVICE USING SUCH ELECTRIC MOTOR

CROSS REFERENCE TO RELATED APPLICATIONS

This application is based on and claims priority under 35 U.S.C. §119 to Japanese Patent Application 2010-247718, filed on Nov. 4, 2010, the entire content of which is incorporated herein by reference.

TECHNICAL FIELD

This disclosure relates to an electric motor, and a vehicle drive device using the electric motor as a drive source.

BACKGROUND DISCUSSION

Electric motors or rotating electrical machines such as generators are provided in drive devices of hybrid vehicles or electric vehicles. This type of rotating electrical machine needs a large amount of current or is used in close proximity of an engine, and thus is disadvantage in a rise in temperature. For this reason, for example, JP-A-2009-100538 describes a technique to ensure safety by monitoring a coil temperature, a temperature of a lubricating oil for cooling, and the like by a temperature sensor at the same time and performing appropriate control by operating a safety circuit if a rise in temperature occurs.

In the technique described in JP-A-2009-100538, a thermistor 50 which is a temperature sensor is inserted into a temperature-sensing-element insertion hole 17 formed at a mold portion 20 formed by molding a parallel winding coil 11 and an inclined winding coil 12 disposed at a stator core 13. In this case, the temperature-sensing-element insertion hole 17 is disposed in the vicinity of the wound coils of the parallel winding coil 11 and the inclined winding coil 12 and a temperature of each of the coils 11 and 12 is monitored.

However, in JP-A-2009-100538, in order to appropriately measure the temperature of each of the coils 11 and 12, the temperature-sensing-element insertion hole 17 and a locking portion 19a for locking the thermistor 50 are integrally molded by an accurate resin mold, which increases cost.

A need thus exists for an electric motor and a vehicle drive device using the electric motor which are not susceptible the drawback mentioned above.

SUMMARY

According to an aspect of the present invention, there is provided an electric motor comprising: a core unit which includes: a plurality of core assemblies annually fixed to a case, each core assembly wound with a coil; and a first terminal connecting one end portion of each coil with each other; an annular bus ring which is attached to the core unit and holds a plurality of power supply lines, the bus ring including a first surrounding portion which opposes each of the core assemblies and surrounds a second terminal connecting the other end portion of each coil with any one of the power supply lines; a plurality of supporting members which are attached to the core assemblies, respectively, each supporting member including a second surrounding portion which surrounds a corresponding first terminal, wherein each supporting member and a corresponding first surrounding portion form a terminal accommodating portion having a box shape with a bottom; and an attachment member which includes at least one of a first holding portion and a second holding portion, wherein the first holding portion is for holding a first sensor for measuring a temperature of an oil stored in the case at a predetermined first position, and the second holding portion is for holding a second sensor for measuring a temperature of the coils at a predetermined second position, wherein the attachment member is fixed to one of the supporting members such that the first or the second sensor is positioned at a corresponding one of the first position and the second position between adjacent terminal accommodating portions.

According to another aspect of the present invention, there is provided a vehicle drive device comprising: a case; an output shaft which is supported by the case to be rotatable around a rotation axis line; and an electric motor which includes: a rotor integrally connected with the output shaft; and a stator fixed to the case. The stator includes: a core unit which includes: a plurality of core assemblies annually fixed to a case, each core assembly wound with a coil; and a first terminal connecting one end portion of each coil with each other; an annular bus ring which is attached to the core unit and holds a plurality of power supply lines, the bus ring including a first surrounding portion which opposes each of the core assemblies and surrounds a second terminal connecting the other end portion of each coil with any one of the power supply lines; a plurality of supporting members which are attached to the core assemblies, respectively, each supporting member including a second surrounding portion which surrounds a corresponding fist terminal, wherein each supporting member and a corresponding first surrounding portion form a terminal accommodating portion having a box shape with a bottom; and an attachment member which includes at least one of a first holding portion and a second holding portion, wherein the first holding portion is for holding a first sensor for measuring a temperature of an oil stored in the case at a predetermined first position, and the second holding portion is for holding a second sensor for measuring a temperature of the coils at a predetermined second position, wherein the attachment member is fixed to one of the supporting members such that the first or the second sensor is positioned at a corresponding one of the first position and the second position between adjacent terminal accommodating portions.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
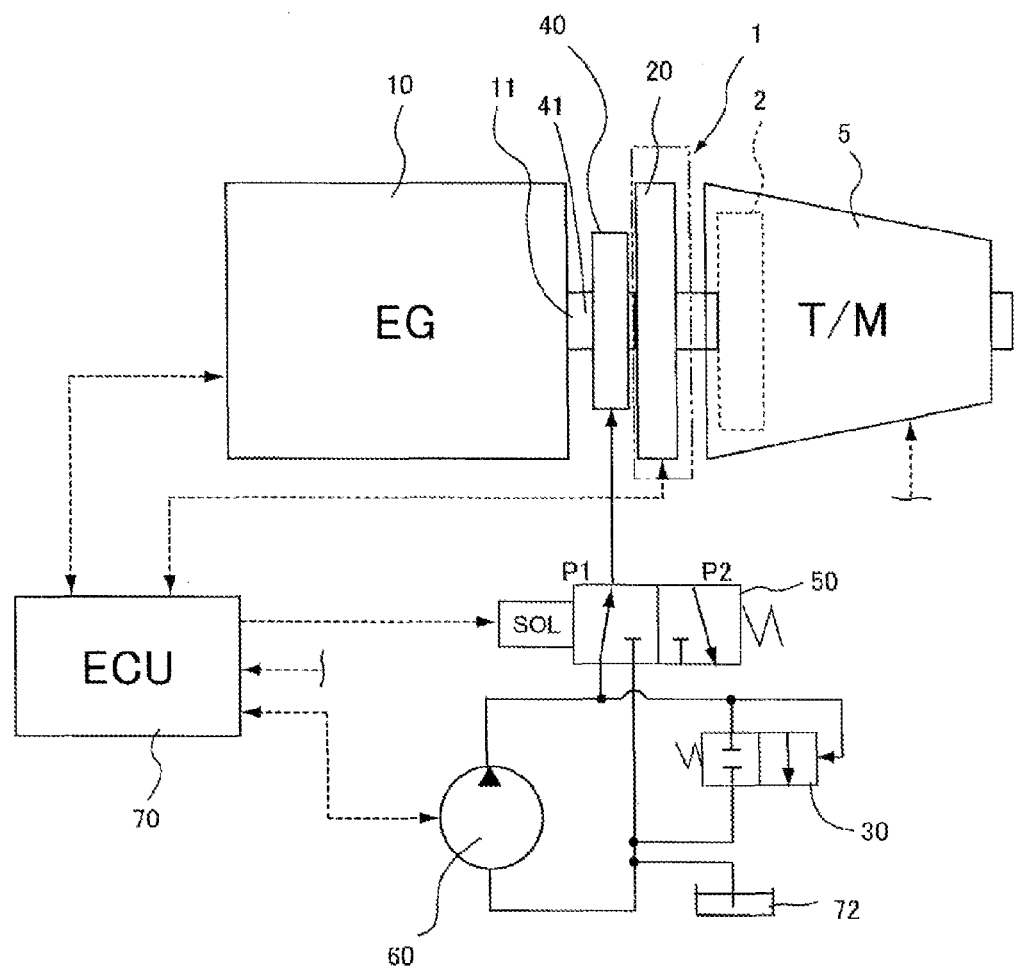
FIG. 1 is a schematic view illustrating a drive system of a hybrid vehicle including a vehicle drive device disclosed here.
Figure 2:
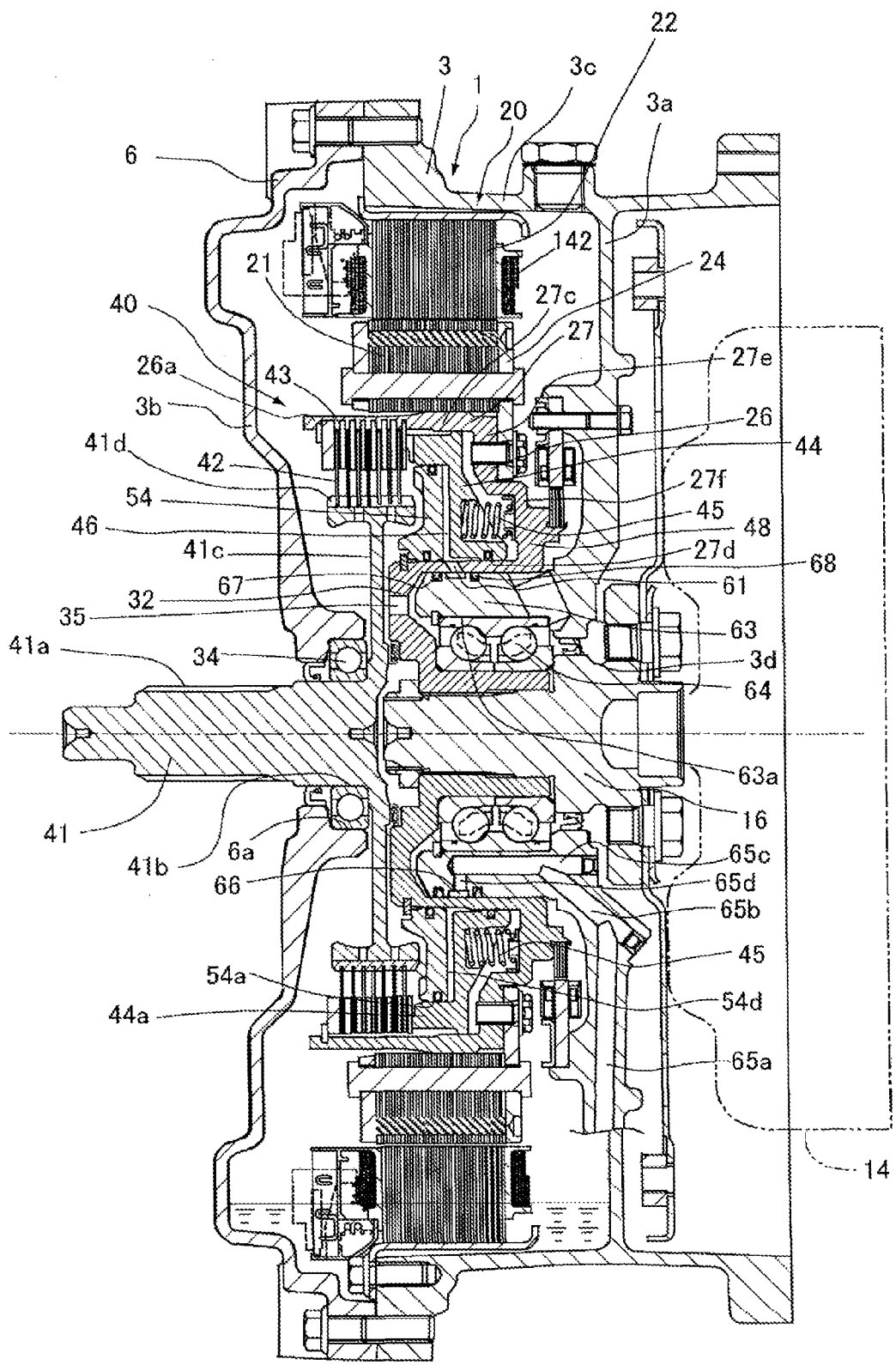
FIG. 2 is a cross-sectional view of a portion including the vehicle drive device shown in FIG. 1.

A hybrid vehicle according to an embodiment disclosed here will be described with reference to the accompanying drawings. FIG. 1 shows a drive system for a hybrid vehicle using an electric motor 20 and a vehicle drive device 1 using the electric motor 20 according to an embodiment disclosed here. As shown in FIG. 2, the vehicle drive device 1 includes a case 3, an output shaft 26 supported by the case 3 to be rotatable around a rotation axis line, and the electric motor 20 having a rotor 21 coupled with the output shaft 26 to be rotatable together with the output shaft 26 and a stator 22 fixed to the case 3 to oppose the rotor 21.

In FIG. 1, solid line arrows represent hydraulic pipes for connecting devices, and broken line arrows represent control signal lines. Further, in FIG. 1, an electromagnetic directional valve 50, a relief valve 30, an electric oil pump 60, and a reservoir 72 are shown separately from the electric motor 20. However, actually, the electromagnetic directional valve 50, the relief valve 30, and the electric oil pump 60 are integrated with the electric motor 20 together with a clutch device 40, and the reservoir 72 is in the case 3 and a front case 6. It is noted that, in the present embodiment, an engine side of the vehicle drive device 1 is referred to as the front side, and a transmission side is referred to as the rear side.

As shown in FIG. 2, the case 3 includes an outer circumferential wall portion 3c configuring an outer appearance, and a rear side wall portion 3a formed between the electric motor 20 and the clutch device 40, and a torque converter 2. Further, in the case 3, the outer circumferential wall portion 3c extends from the rear side wall portion 3a toward an automatic transmission 5 by a predetermined distance, so as to cover a portion of the torque converter 2. Furthermore, the extending case 3 is fixed to a case (not shown) for covering the other portion of the torque converter 2 by bolts, so as to form a case (not shown) of the automatic transmission 5.

On the engine 10 side of the case 3, the front case 6 is disposed to serve as a lid portion of the case 3 and form a front side wall portion 3b, and the case 3 and the front case 6 are fixed by the bolts. At the center portion of the front side wall portion 3b of the front case 6 configures the case 3, a through-hole 6a is provided to support an input shaft 41. Further, a hole bearing 34 is interposed between the through-hole 6a and the input shaft 41, so as to support the input shaft 41 such that the input shaft 41 is rotatable.

The input shaft 41 is connected to an output shaft 11 (see FIG. 1) of the engine 10 through a fly-wheel (not shown) and a damper for absorbing rotation vibrations such that the input shaft 41 and the output shaft 26 are rotatable together. The input shaft 41 includes a fixed portion 41a to the damper, a connection portion supported by the through-hole 6a to be rotatable, and an annular portion 41c having a small-diameter-side engagement portion 41d formed at an outer circumferential portion and engaged with friction plates 42.

As shown in FIG. 1, the engine (EG) 10 serving as a drive source of the vehicle and the electric motor 20 which is a rotating electrical machine are connected in series through the clutch device 40 which is an engageable and releasable multi-plate wet clutch. The clutch device 40 connects or disconnects the engine 10 and the electric motor 20 so as to control torque transmission. Further, the electric motor 20 is connected in series with the automatic transmission 5 of the vehicle, and the automatic transmission 5 is connected to drive wheels of the vehicle (not shown) through a differential device (not shown). The automatic transmission (T/M) 5 includes a transmission (not shown) and the torque converter 2, and an output of the torque converter 2 is input to an input shaft of the transmission.

As shown in FIGS. 1 and 2, the electric motor 20 and the torque converter 2 are connected through the output shaft 26 and a center piece 16 which is an input shaft of the torque converter 2, so as to be rotatable together.

The center piece 16 which is the input shaft of the torque converter 2 is arranged on the same rotation axis as that of the input shaft 2, and is connected to a front cover 14 of the torque converter 2 to be rotatable integrally with the front cover 14. Therefore, if the front cover 14 rotates with the center piece 16, a pump impeller (not shown) of the torque converter 2 connected with the front cover 14 rotates. As a result, an oil flow is generated by the pump impeller, and a turbine runner (not shown) connected to the input shaft of the transmission rotates by the generated oil flow, such that a rotating force is transmitted to the input shaft of the transmission. The rotation axes of the output shaft 26, the center piece 16, and the front cover 14 are arranged on the same rotation axis as that of the input shaft of the transmission.

The engine 10 is a general internal-combustion engine which generates power by a hydrocarbon-based fuel. However, the engine 10 is not limited thereto, but may be any drive source which drives a rotation shaft. Further, the electric motor 20 is a synchronous motor for driving wheels of a vehicle; however, the electric motor 20 is not limited thereto. Further, the automatic transmission 5 is a general planetary gear type automatic transmission; however, the automatic transmission 5 is not limited thereto. The clutch device 40 is a normally closed type clutch device which normally connects the engine 10 and the electric motor 20.

As shown in FIG. 1, the electromagnetic directional valve 50 is a 2-position electromagnetic valve having three ports, and one port is connected to a hydraulic chamber 46 of the clutch device 40 by pipe lines 65a, 65b, 65c, and 65d shown in FIG. 2. Further, another port is connected to an outlet of the electric oil pump 60, and the other port is connected to the reservoir 72, that is, the inside of the case 3 and the front case 6. The relief valve 30 is connected to the outlet of the electric oil pump 60.

When the electromagnetic directional valve 50 is at an operation position P1 shown in FIG. 1, the outlet of the electric oil pump 60 is connected to the hydraulic chamber 46, and the reservoir 72 is connected to an inlet of the electric oil pump 60. Then, the electric oil pump 60 suctions oil in the reservoir 72, and supplies a hydraulic pressure to the hydraulic chamber 46 through the electromagnetic directional valve 50, such that the connection of the clutch device 40 is released. In this state, if the pressure of the oil discharged from the electric oil pump 60 to the hydraulic chamber 46 becomes excessive, the relief valve 30 connected to the outlet of the electric oil pump 60 operates to release the pressure, such that an appropriate amount of oil is supplied to the hydraulic chamber 46.

When the electromagnetic directional valve 50 is at an operation position P2 shown in FIG. 1, the hydraulic chamber 46 is connected to the reservoir 72. Then, the pressure in the hydraulic chamber 46 becomes atmospheric pressure, and thus the oil (hydraulic pressure) is fed back to the reservoir 72, such that the clutch device 40 is connected.

The electromagnetic directional valve 50 and the electric oil pump 60 are electrically connected to a controller (ECU) 70. The controller 70 operates the electric oil pump 60 and the electromagnetic directional valve 50 such that the oil having an appropriate hydraulic pressure is supplied to the clutch device 40. As a result, the clutch device 40 is controlled such that the clutch device 40 becomes a desired connection state.

The controller 70 controls the rotation of the engine 10 or the electric motor 20, such that the vehicle runs. Further, the controller 70 is connected with an electromagnetic solenoid (not shown) for operating a shift valve of the automatic transmission 5, and controls the operation of the automatic transmission 5 based on the rotation speed of the engine 10, the speed of the vehicle, a shift portion, and the like.

The clutch device 40 includes a plurality of separate plates 43 engaged with a large-diameter-side engagement portion 26a of the output shaft 26, a plurality of friction plates 42 engaged with the small-diameter-side engagement portion 41d of the input shaft 41, cylinder members 48 formed integrally with the output shaft 26, and piston members 44 fitted into the cylinder members 48 to be slidable in a rotation axis line direction and having pressing portions 44a for pressing the plurality of separate plates 43 and the plurality of friction plates 42.

Further, the clutch device 40 includes coil springs 45 which are provided in a compressed state between the piston members 44 and the cylinder members 48 and bias the piston members 44 toward the plurality of separate plates 43 and the plurality of friction plates 42, and the hydraulic chamber 46 formed between the piston members 44 and the cylinder members 48.

The clutch device 40 is configured in that way, such that when the electric oil pump 60 is driven and a predetermined hydraulic pressure is supplied into the hydraulic chamber 46 through the electromagnetic directional valve 50 and an inflow port 61 by the controller 70, the hydraulic pressure supplied to the hydraulic chamber 46 biases the piston members 44 such that the piston members 44 move toward the output shaft side against the spring forces of the coil springs 45. Then, the pressing portions 44a of the piston members 44 are separated from the friction plates 42 and the separate plates 43 such that the engagement between the friction plates 42 and the separate plates 43 is released.

Further, the electromagnetic directional valve 50 is driven to be switched from the position P1 side to the position P2 side. Then, the oil in the hydraulic chamber 46 is fed back to the reservoir 72, that is, a lower portion of the inside of the case 3 and the front case 6 which are, such that the pressure in the hydraulic chamber 46 is reduced. As a result, the piston members 44 are pushed toward the input shaft by the biasing of the coil springs 45. Accordingly, the pressing portions 44a of the piston members 44 presses the separate plates 43 such that the separate plates 43 and the friction plates 42 are engaged with each other.

The output shaft 26 has an inverted S-shaped section in the rotation axis direction shown in FIG. 2, and includes outer circumferential openings 27 formed on the outer circumferential side in the radial direction to be opened toward the engine 10, and inner circumferential openings 32 formed on the inner circumferential side to be opened toward the automatic transmission 5. Each of the outer circumferential openings 27 is surrounded and formed by a small-diameter-side wall portion 27d, a large-diameter-side wall portion 27c, and stepped wall portions 27e and 27f. Each outer circumferential opening 27 is also used as a portion of a corresponding cylinder member 48. Specifically, each cylinder member 48 is formed by a corresponding outer circumferential opening 27 and a fixed member 54. The plurality of annular separate plates 43 are engaged with the large-diameter-side engagement portion 26a of the inner circumferential surface of the input-shaft-side front end portion of the large-diameter-side wall portion 27c, such that the rotation of the separate plates 43 is controlled and the separate plates 43 are movable in the rotation axis line direction.

Further, the plurality of separate plates 43 and the plurality of the friction plates 42 engaged with the input shaft 41 are disposed so as to be capable of alternately coming into contact with each other and being separated from each other. In a state where the friction plates 42 and the separate plates 43 is alternately disposed, if the separate plates 43 are pressed toward the input shaft in the rotation axis line direction, the separate plates 43 move in an axis direction. Then, each friction plate 42a attached to both surfaces of each of the friction plates 42 and each separate plate 43 are mutually pressed to be engaged, such that the input shaft 41 and the output shaft 26 are connected to be rotatable together. Therefore, the output shaft 11 of the engine 10 and the input shaft of the automatic transmission 5 rotate integrally with each other.

The inner circumferential openings 32 formed on the inner circumferential side in the radial direction of the output shaft 26 is connected with the center piece 16 by spline-fitting, so as to be rotatable integrally with the center piece 16. In a space surrounded by the inner circumferential opening 32 and the small-diameter-side wall portion 27d of the outer circumferential opening 27 and opened toward the automatic transmission 5, an annular protrusion 63 is provided to protrude from the rear-side side-wall portion 3a of the case 3. Further, the inner circumferential surface of the small-diameter-side wall portion 27d is fitted with an outer circumferential surface 63b of the protrusion 63, and a ball bearing 64 is interposed between an inner circumferential surface 63a of the protrusion 63 and the fixed portion of the inner circumferential opening 32, such that the protrusion 63 and the inner circumferential opening 32 can smoothly rotate with respect to each other.

Inside the rear-side side-wall portion 3a and the protrusion 63, as described above, the pipe lines 65a, 65b, 65c, and 65d for connecting the electromagnetic directional valve 50 and the hydraulic chamber 46 are formed to be connected. The pipe line 65a is a connection pipe line on the electromagnetic directional valve 50 side, and the pipe line 65d is a connection pipe line on the hydraulic chamber 46 side. Further, the pipe line 65d is connected with an oil path 66 engraved on the entire circumference of the outer circumferential surface 63b of the protrusion 63. The oil path 66 is connected to the hydraulic chamber 46 through the inflow port 61 penetrating through the small-diameter-side wall portion 27d of the outer circumferential openings 27 so as to allow the oil to be supplied to or discharged from the hydraulic chamber 46.

On both sides of the oil path 66 in the rotation axis line direction, grooves are engraved, and annular rings 67 and 68 made of, for example, a resin are provided in the grooves, so as to control leakage of the oil from the oil path 66. In order to supply a portion of the oil of the oil path 66 as a lubricating oil to a bearing in the internal space of the inner circumferential openings 32 or the like, the vicinity of the annular rings 67 and 68 is designed to allow a predetermined amount of oil to be leaked. If the internal space of the inner circumferential openings 32 is full of the oil (lubricating oil) supplied to the internal space, the oil is leaked from an oil hole 35 of the inner circumferential openings 32 so as to be supplied to a wall surface 38 of the opposing annular portion 41c. Then, when the annular portion 41c rotates, the oil supplied to the wall surface 38 is supplied to the friction plates 42 and the separate plates 43 by a centrifugal force, so as to lubricate and cool the friction plates 42 and the separate plates 43. Further, the oil supplied to the wall surface 38 is scattered by the centrifugal force, so as to cool the rotor 21 and the stator 22 of the electric motor 20. Then, the oil having cooled each portion falls by gravity, so as to be stored in the reservoir 72, that is, the lower portion of the inside of the case 3 and the front case 6.

Next, the electric motor 20 according to the present embodiment will be described with reference to FIGS. 2 to 23. The electric motor 20 configured by a 3-phase AC motor is disposed on the outer circumferential side of the outer circumferential openings 27 of the output shaft 26. The electric motor 20 includes a cylindrical rotor 21 that is connected to the output shaft 26 so as to be rotatable together with the output shaft 26, the stator 22 disposed to oppose the outer circumference of the rotor 21 in the radial direction and formed by stacking lamination silicon steel plates (not shown), and a coil 142 wound around the stator 22. The stator 22 is fixed to an inner circumferential surface of the outer circumferential wall portion 3c of the case 3. A plate member 24 of the rotor 21 extends from the output-shaft-side end surface toward the inner circumferential side in the radial direction and is fixed to an output-shaft-side side surface of a bottom wall portion 27e of the output shaft 26 by bolts. Therefore, in the electric motor 20, only the rotor 21 rotates integrally with the output shaft 26. Further, the coil 142 is electrically connected to the controller 70, and the controller 70 controls an amount of current to the coil 142 or interruption of current application to the coil 142 based on signals from all sensors (not shown) for detecting various states (such as a vehicle speed sensor, a throttle position sensor, a shift position sensor, and the like). A wiring method for the motor is Y-connection. However, the wiring method is not limited to the Y-connection, may be other methods (for example, delta connection).

Figure 4:
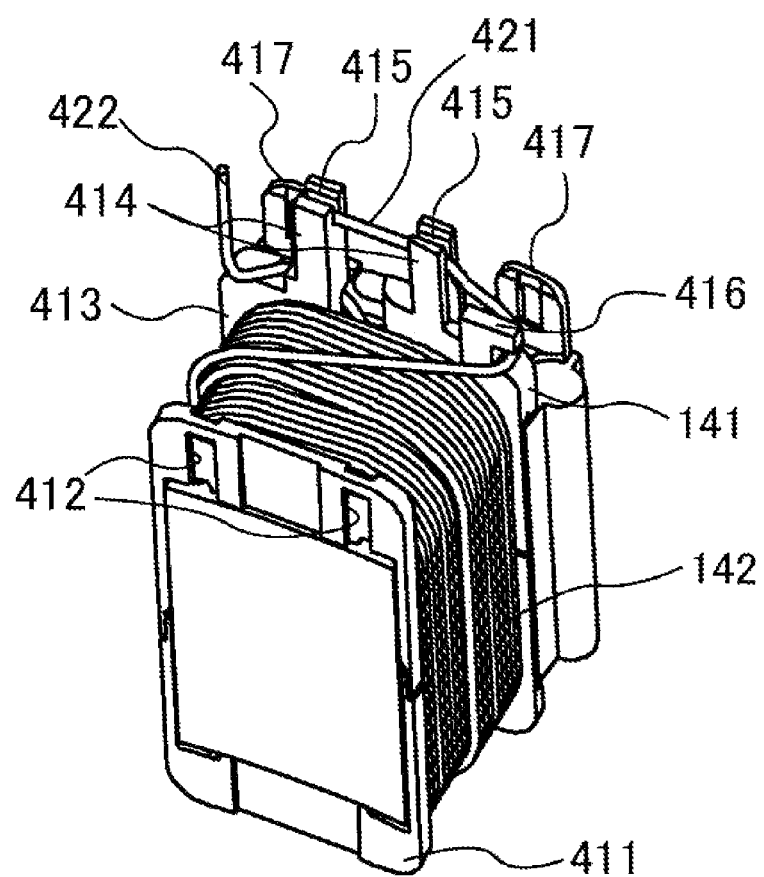
FIG. 4 is a perspective view of a division core in a state in which a low-voltage terminal box is removed.
Figure 5:
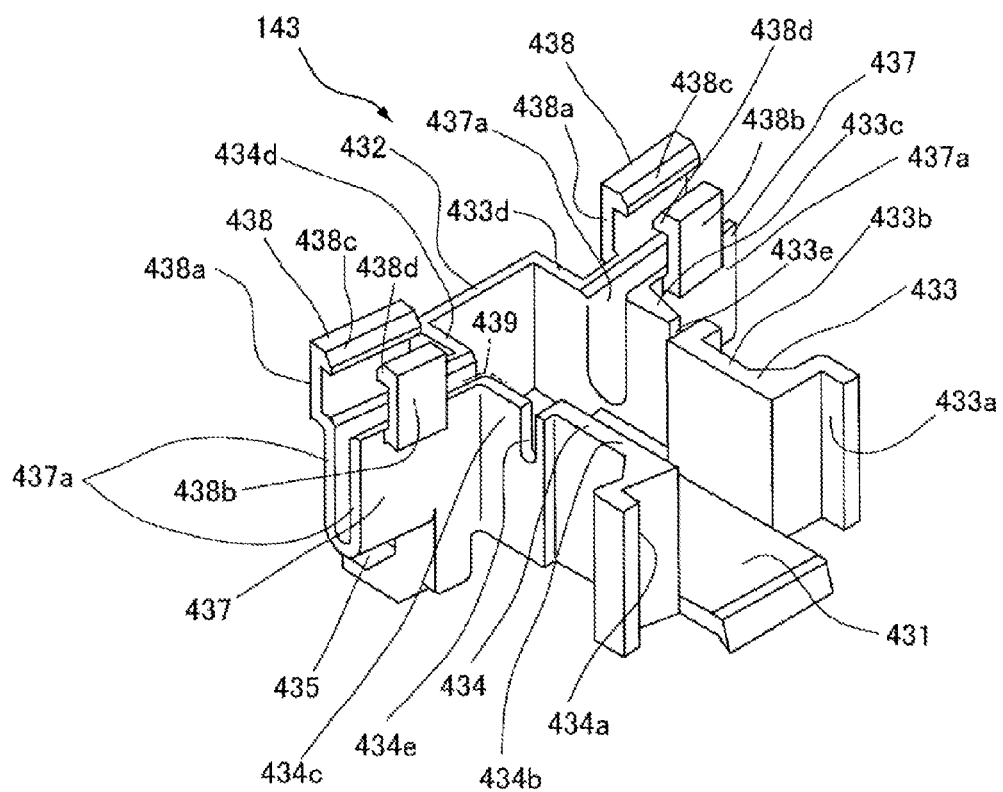
FIG. 5 is a perspective view of the low-voltage terminal box.
Figure 9:
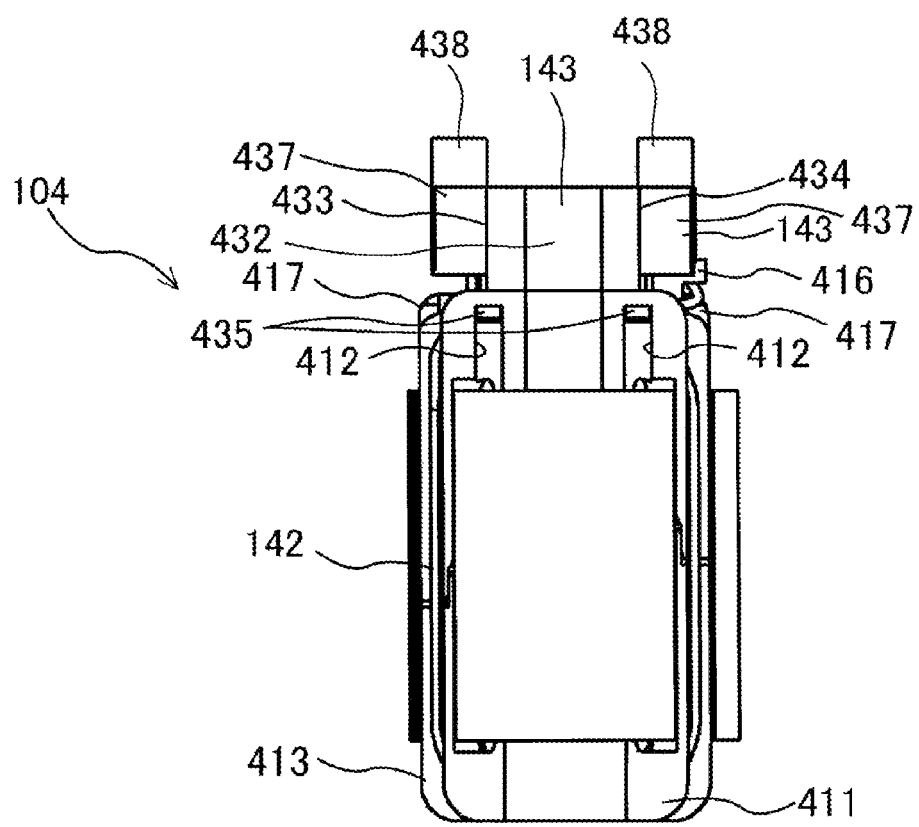
FIG. 9 is a side view illustrating the division core as seen in an inner circumferential direction.
Figure 10:
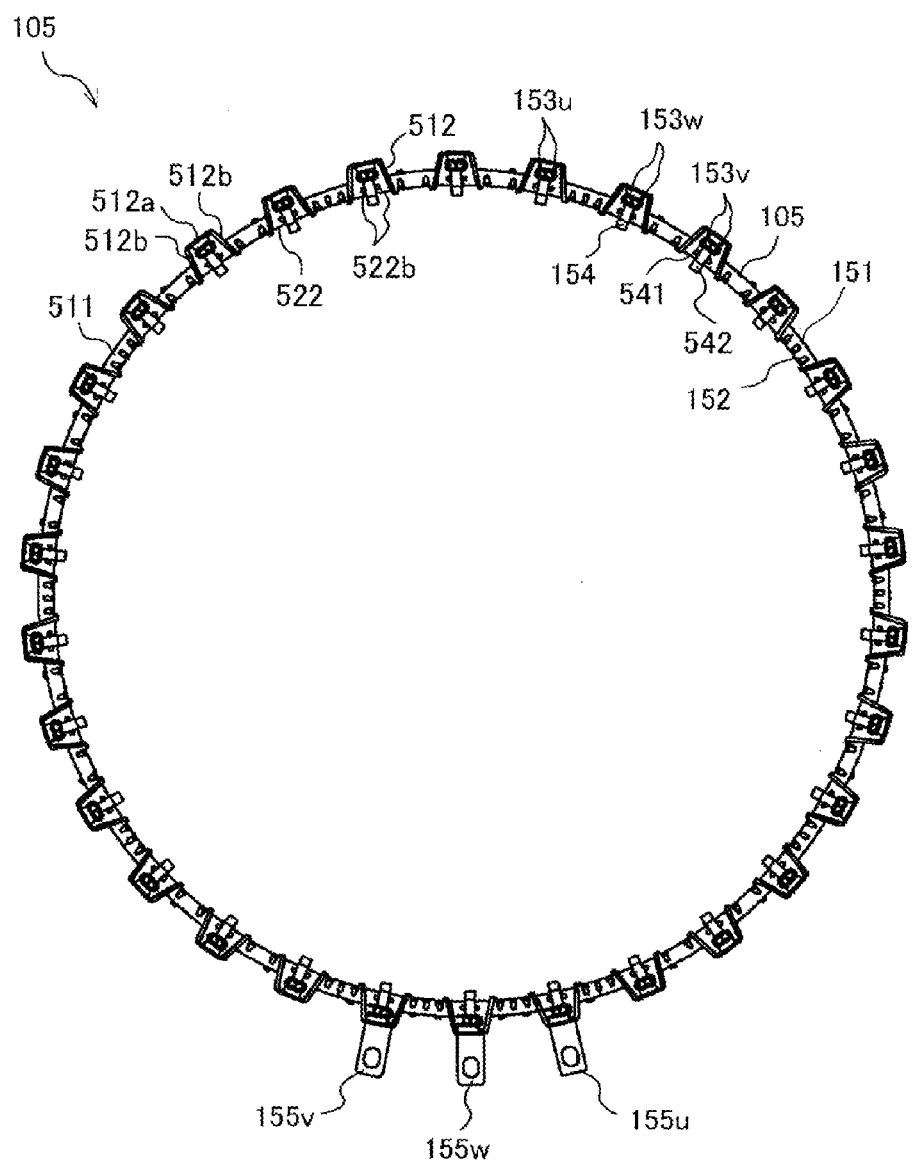
FIG. 10 is a plan view of a bus ring.
Figure 11:
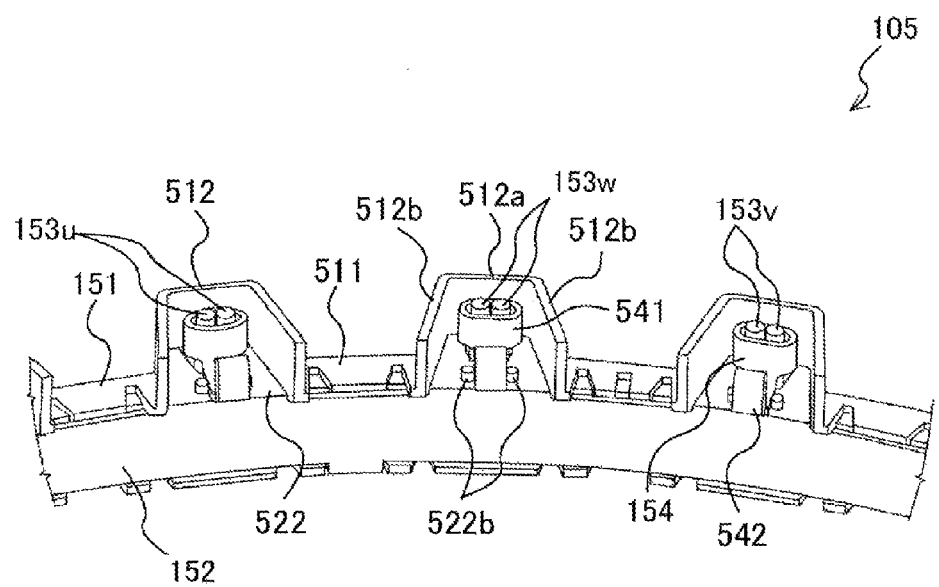
FIG. 11 is a partially enlarged perspective view of the bus ring shown in FIG. 10 as seen from the inner side in a radial direction.

Next, the stator 22 will be described with reference to FIGS. 3 to 23. In the description, the upper and lower sides of the stator 22 in FIG. 3 correspond to a mounted state of an actual stator 22. The upper side and the lower side of FIG. 4 are referred to as the upper side and the lower side of division cores 104; however, these directions have no relation with the directions on the actual stator 22. Further, in the description, the upper side and the lower side of FIG. 5 are referred to as the upper side and the lower side of a low-voltage terminal box 143 (an example of a supporting member); however, these directions have no relation with the directions on the actual stator 22. Furthermore, in the description, the left side (corresponding to the inner side in the radial direction of the stator 22) of FIG. 5 is referred to as the rear side of the low-voltage terminal box 143, and the right side (corresponding to the outer side in the radial direction of the stator 22) of FIG. 5 is referred to as the front side of the low-voltage terminal box 143; however, these directions have no relation with the directions on the actual stator 22. Moreover, in the description, the upper side and the lower side of FIG. 10 are referred to as the upper side and the lower side of a bus ring 105; however, these directions have no relation with the directions on the actual stator 22.

Figure 3:
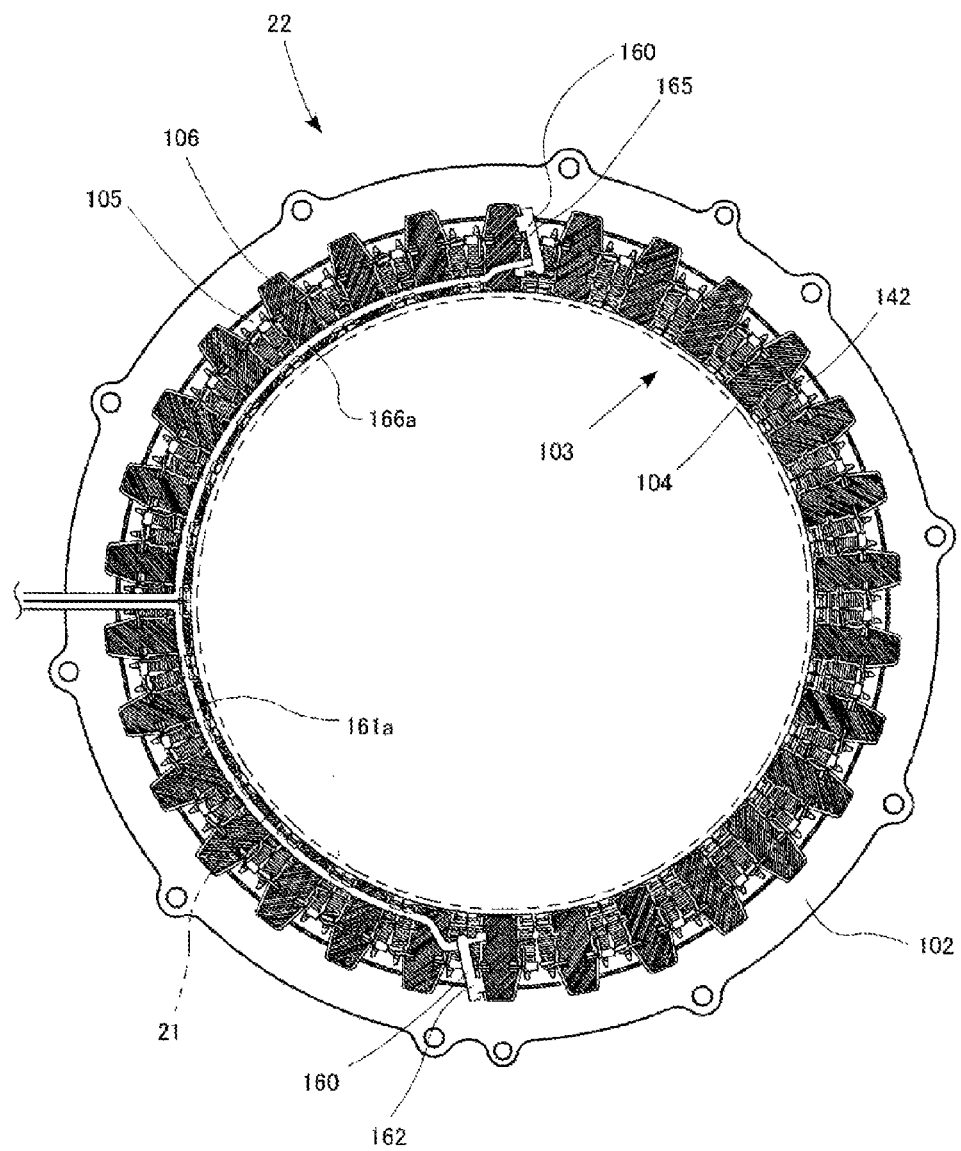
FIG. 3 is a plan view illustrating a stator of an electric motor shown in FIG. 2.

FIG. 3 shows a plan view of the stator 22. On the inner circumferential surface of a stator housing 102, a plurality of (30 in the present embodiment) division cores 104 (an example of core assemblies) are disposed at predetermined intervals. The division cores 104, each of which is wound with the coil 142, are successively and annularly arranged in the stator housing 102, so as to form a core unit 103. The core unit 103 and the bus ring 105 form a plurality of terminal accommodating portions 106 having a box shape with a bottom, and each of the terminal accommodating portions 106 is filled with an insulating resin material.

Further, in FIG. 3, the rotor 21 is shown to oppose the inner circumferential side of the core unit 103 by an alternate long and two short dashes line. When a power is applied to the division cores 104, such that a rotating magnetic field is generated in the core unit 103, the rotor 21 rotates with respect to the stator 22.

FIG. 4 shows a state in which the low-voltage terminal box 143 (to be described below) is removed from a division core 104. The division core 104 includes a bobbin 141 including lamination steel plates (shown in FIG. 4) therein. The bobbin 141 is made of a synthetic resin material, such that the lamination steel plates 45 inside the bobbin 141 are insulated. When the division core 104 is held in the stator housing 102, at portions of the bobbin 104 positioned at the inner circumferential end, a first flange 411 is formed to protrude in upper, lower, left and right directions.

At an upper portion of the first flange 411, a pair of locking holes 412 is formed. The locking holes 412 pass through the first flange 411, and are formed to be spaced apart from each other by a predetermined distance in a circumferential direction when the division core 104 is held by the stator housing 102.

Further, a second flange 413 is formed on the outer side in the radial direction to protrude in upper, lower, left and right directions and oppose the first flange 411 when the division core 104 is held by the stator housing 102. At an upper end portion of the second flange 413, a pair of wire locking portions 414 is provided at positions spaced apart from each other in the circumferential direction by a predetermined distance, to extend upward. At an upper end portion of each of the wire locking portions 414, a holding slit 415 is formed to extend in the circumferential direction.

Further, at the upper end of the second flange 413, a hook portion 416 is formed on a side of one wire locking portion 414. The hook portion 416 has an approximately L shape bent outward in the circumferential direction of the division core 104.

Further, when the division core 104 is held by the stator housing 102, at portions of the bobbin 141 positioned at the outer circumferential end, a pair of retainers 417 is formed to protrude upward. The retainers 417 are provided at positions spaced apart from each other in the circumferential direction by a predetermined distance, and oppose the low-voltage terminal box 143 (to be described below) in the radial direction of the stator 22. In the radial direction of the stator 22, between the retainers 417 and the second flange 413, a bus-ring inserting portion 418 is formed (see FIG. 8).

Between the first flange 411 and the second flange 413, the coil 142 such as an enamel wire is wound. A high-voltage-side end portion 421 of the wound coil 142 (an example of one end portion of a coil) is engaged with the hook portion 416, is turned around, and then is inserted into the holding slits 415 of the two wire locking portions 434, so as to be hung between the wire locking portions 414 (see FIG. 4).

Figure 6:
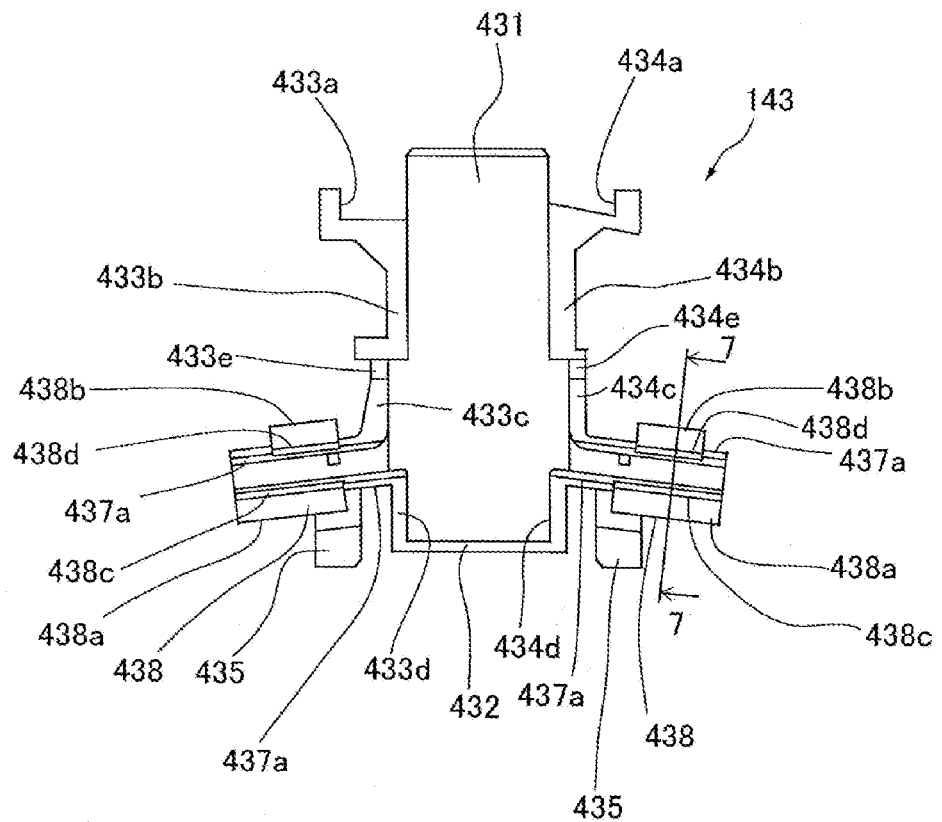
FIG. 6 is a plan view of the low-voltage terminal box.
Figure 7:
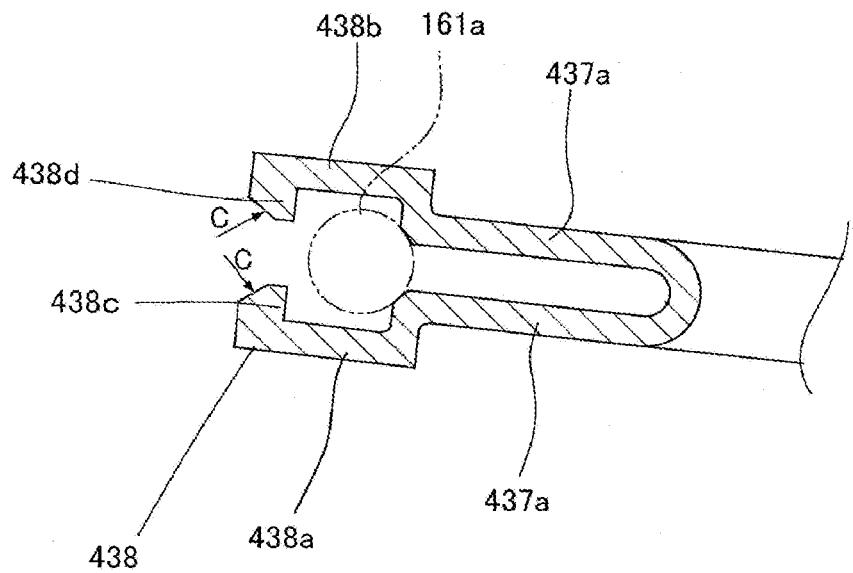
FIG. 7 is a cross-sectional view taken along a line 7-7 of FIG. 6.

The low-voltage terminal box 143 shown in FIGS. 5 to 7 is integrally made of aromatic nylon or a polyphenylene sulfide resin and has an approximate container shape; however, the low-voltage terminal box 143 is not limited thereto. The low-voltage terminal box 143 has a rear wall 432 provided on a rear end portion of a bottom plate portion 431, and a pair of side plates 433 and 434 standing from side end portions of the bottom plate portion 431 (the rear wall 432 and the side plates 433 and 434 are an example of a second surrounding portion).

The side plates 433 and 434 include side walls 433b and 434b and side walls 433d and 434d. A width between the side walls 433b and 434b is approximately same as a width between the side walls 433d and 434d. Further, the side plates 433 and 434 include side walls 433c and 434c. The side wall 433c is provided to stand between the side walls 433b and 433d, the side wall 434c is provided to stand between the side walls 434b and 434d, and a width between the side walls 433c and 434c is slightly larger than the width between the side walls 433b and 434b or the width between the side walls 433d and 434d. An upper side and front side (the side on the stator 22 on which the bus ring 105 (to be described below) is positioned) of the low-voltage terminal box 143 are opened such that the low-voltage terminal box 143 has an approximate U shape as seen in plan view. The low-voltage terminal box 143 is formed on the bobbin 43 to be attachable and detachable.

At the front end portions of the side walls 433b and 434b of the side plates 433 and 434, stepped portions 433a and 434a are formed such that a distance between the side walls 433b and 434b increases. Further, at the rear end portions of the side walls 433d and 434d (one of which is not shown), both rear end portions 435 of the low-voltage terminal box 143 protrude downward (see FIGS. 5 and 6).

Further, on the side walls 433c and 434c, holding grooves 433e and 434e are formed to be opened upward. Furthermore, from between side walls 433c and 433d and between the side walls 434c and 434d, terminal mounting portions 437 (an example of a mounting portion) extend outward in the circumferential direction. Each of the terminal mounting portions 437 is formed by a pair of pinching walls 437a extending in parallel to each other and having lower ends connected to each other, so as to have an approximately U-shaped section. Between the pinching walls 437a opposing each other, a gap is formed such that a neutral terminal 144 (to be described below) can be inserted.

From an upper end (an example of an end portion side) of each of the terminal mounting portions 437, a conductive-wire holding portion 438 for holding a conductive wire for a thermistor (an example of a first or second sensor) which is a temperature sensor is formed to extend upward, as shown in the cross-sectional view of FIG. 7. The conductive-wire holding portion 438 includes a wall 438a having a large width in the circumferential direction, and a wall 438b opposing the wall 438a and having a smaller width in the circumferential direction than that of the wall 438a. The wall 438a is formed at an upper end portion of the pinching wall 437a which configures the inner circumferential side of the stator 22, and the wall 438b is formed at an upper end portion of the pinching wall 437a which configures the outer circumferential side of the stator 22. The wall 438a and the wall 438b extend farther away from the upper ends of the pinching walls 437a in parallel to the bottom plate portion 431 by a short distance, are bent to a right angle, and then extend by a predetermined distance. Then, the wall 438a and the wall 438b extend upward and are bent to come close to each other, so as to form claw portions 438c and 438d. A gag between the claw portions 438c and 438d is formed to be slightly narrower than a diameter of the conductive wire to be held by the holding portion 438, and the conductive wire held by the holding portion 438 is blocked between the claw portions 438c and 438d so as not to easily deviate from the conductive-wire holding portion 438.

Further, at upper portions of opposing portions of the claw portions 438c and 438d, tapers C having a predetermined size are provided such that the conductive wire is smoothly fitted between the claw portions 438c and 438d (see FIG. 7).

Figure 8:
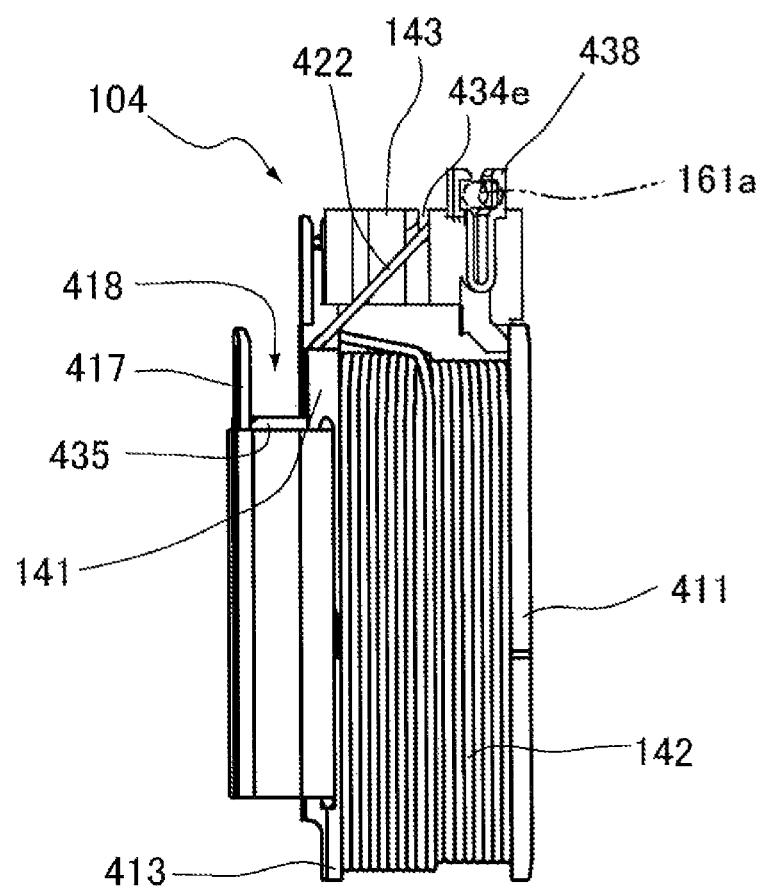
FIG. 8 is a side view illustrating the division core as seen in a circumferential direction.

As shown in FIG. 8, the low-voltage terminal box 143 is attached on the bobbin 141 wound with the coil 142, thereby completing the division core 104. As shown in FIG. 9, when the low-voltage terminal box 143 is attached to the bobbin 141, both rear end portions 435 of the low-voltage terminal box 143 are inserted into locking holes 412 of the bobbin 141. Further, the stepped portions 433a and 434a of the side plates 433 and 434 shown in FIG. 6 are engaged with wire holding portions 414 shown in FIG. 4 from the outer side in the circumferential direction, such that the low-voltage terminal box 143 is positioned with respect to the bobbin 141 in a horizontal plane.

Next, the low-voltage-side end portion 422 of the coil 142 (an example of one end portion of a coil) is inserted into the holding groove 433e provided on the side wall 433c of the side plate 433 and then is engaged with the holding groove 434e provided on the side wall 434c of the side plate 434. In this way, the low-voltage-side end portion 422 is hung between the side plates 433 and 434 (see FIG. 14).

Figure 14:
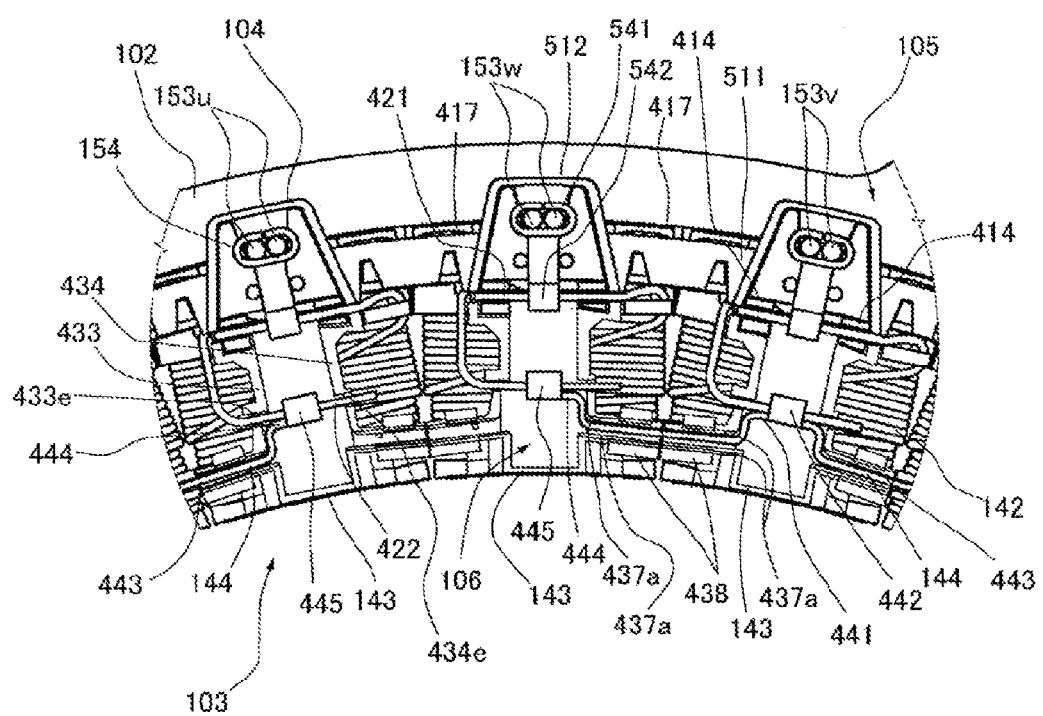
FIG. 14 is a partial plan view of a state in which the bus ring is attached to a core unit, as seen in a rotation axis direction.

All of the division cores 104 are attached on the inner circumferential surface of the stator housing 102 to be annularly arranged, and then the neutral terminals 144 (an example of first terminals) are mounted on the low-voltage terminal box 143 (see FIG. 14).

The neutral terminal 144 is made of a conductive metal. The neutral terminal 144 has a symmetrical shape with respect to a central protrusion 441 positioned at the center in the longitudinal direction in a plan view of FIG. 14. The central protrusion 441 protrudes outward in the radial direction in a state the low-voltage terminal box 143 is attached, and has a central connection piece 442 formed thereon. Further, at both end portions of the central protrusion 441, linear insertion portions 443 are formed, and at each of the insertion portions 443, an end edge portion 444 is formed to protrude outward in the radial direction. At each end edge portion 444, an end-portion connection piece 445 is formed.

The neutral terminal 144 is mounted over three adjacent low-voltage terminal boxes 143 by inserting each of the insertion portions 443 into between the pinching walls 437a of each low-voltage terminal box 143. Therefore, the central connection piece 442 and a pair of end-portion connection pieces 445 are disposed in the low-voltage terminal boxes 143 of three successive division cores 104. The central connection pieces 442 and the end-portion connection pieces 445 are fixed to the low-voltage-side end portion 422 of the coil 142 provided to be hung between the side plates 433 and 434, by fusing, caulking, welding, or the like, such that the low-voltage-side end portions 422 of the individual coils 142 are connected.

As shown in FIGS. 10 to 13, the bus ring 105 is formed annularly to oppose the core unit 103 from the outer side in the radial direction. The bus ring 105 includes an outer clip 151 and an inner clip 152 annularly made of a synthetic resin material, and fitted with each other in the radial direction. Each of the outer clip 151 and the inner clip 152 may be formed by connecting a plurality of divided segments.

From three places of the outer clip 151, external terminals 155u, 155v, and 155w extend to be connected to high-voltage-side phases of an inverter, respectively. The external terminals 155u, 155v, and 155w are connected to power supply terminals 154 having individual phases (to be described below) in the bus ring 105; however, the external terminals 155u, 155v, and 155w may be integrally formed with the power supply terminals 154.

The bus ring 105 has a plurality of segment wires 153u, a plurality of segment wires 153v, and a plurality of segment wires 153w having individual phases (an example of power supply lines). The segment wires 153u, 153v, and 153w are made of, for example, enamel wires in an arc shape. Further, the bus ring 105 includes the power supply terminals 154 (an example of second terminals) which are made of a conductive metal by caulking the segment wires 153u, 153v, and 153w (see FIG. 11).

Figure 12:
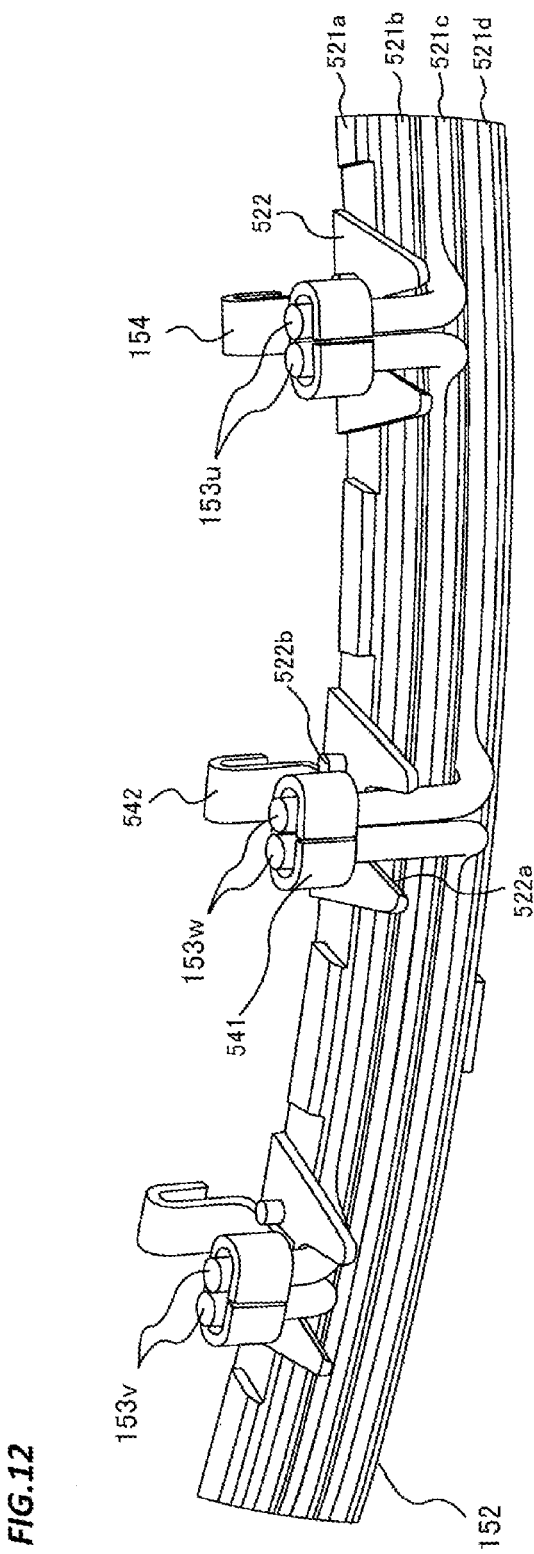
FIG. 12 is a perspective view of an inner clip of the bus ring as seen in an outer circumferential direction.

As shown in FIG. 12, on the outer circumferential surface of the inner clip 152, a pair of annular ribs 521b and 521c are formed, so as to pinch the segment wires 153u, 153v, and 153w while insulating the segment wires 153u, 153v, and 153w having the same phase from each other, together with an upper surface 521a and a bottom surface 521d.

Figure 13:
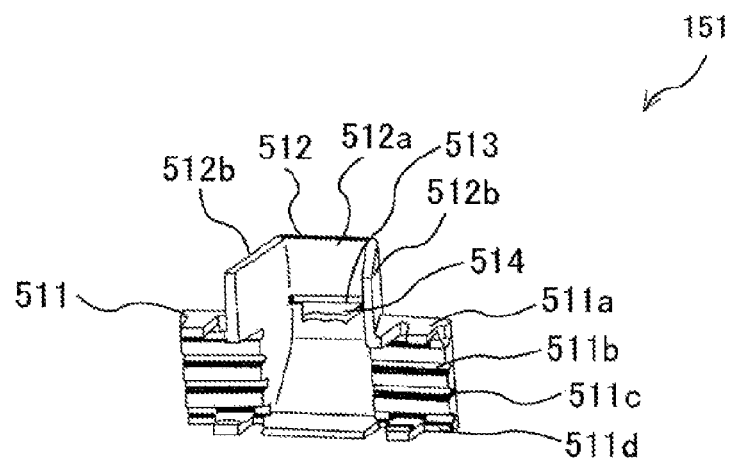
FIG. 13 is a perspective view of an outer clip of the bus ring as seen in an inner circumferential direction.

As shown in FIG. 13, the outer clip 151 fitted with the inner clip 152 has an annular portion 511, and even in the inner circumferential surface of the annular portion 511, the ribs 511b and 511c and the bottom portion 511 are formed. The outer clip 151 and the inner clip 152 hold the segment wires 153u, 153v, and 153w together.

Upwardly extending end portions of the segment wires 153u, 153v, and 153w having the same phase are connected by caulking the power supply terminals 154 (an example of power supply lines).

The power supply terminals 154 include caulked portions 541 formed by caulking end portions of the segment wires 153u, 153v, and 153w, and coil engagement portions 542 extending from the caulked portions 541 inward in the radial direction of the bus ring 105. The tip edges of the coil engagement portions 542 are formed to extend upward and then come down, so as to have an approximately inverted U shape (see FIG. 12).

From an upper surface 521a of the inner clip 152, a plurality of holding flanges 522 protrude outward in the radial direction on the circumference at regular intervals. On the holding flanges 622, trapezoidal notches 522a are formed to allow the end portions of corresponding segment wires 153u, 153v, and 153w to be inserted. Further, on each of the holding flanges 522, a pair of protrusions 522b is formed. The coil engagement portions 542 of the power supply terminals 154 are held between the holding protrusions 522b.

Meanwhile, from an upper surface 511a of the outer clip 151, a plurality of surrounding portions 512 (an example of first surrounding portions) protrudes upward (see FIG. 13). The surrounding portions 512 are provided on the circumference of the outer clip 151 at regular intervals. Each of the surrounding portions 512 includes a standing wall portion 512a extending in the circumferential direction of the bus ring 105, and a pair of side walls 512b (an example of side walls of the first surrounding portion) extending from both edge portions of the standing wall portion 512a toward the inner side in the radial direction.

The end portions of the side walls 512b are opened, such that the surrounding portion 512 is approximately U-shaped in plan view. The outer clip 151 is fitted with the inner clip 152, such that the surrounding portions 512 surround the power supply terminals 154 formed by caulking the segment wires 153u, 153v, and 153w (see FIG. 11). The end portions of the segment wires 153u, 153v, and 153w having the same phase protrude in every three surrounding portion 512 on the circumference of the bus ring 105.

Among the plurality of standing wall portions 512a, at three standing wall portions 512a from which the external terminals 155u, 155v, and 155w are drawn, terminal holes 513 are formed. Further, on the inner circumferential surfaces of the three standing wall portions 512a, supporting pieces 514 holding the caulked portions 541 of the power supply terminals 154 protrude (see FIG. 13).

The bus ring 105 is attached to the core unit 103 held by the stator housing 102, such that the bus ring 105 opposes the core unit 103 from the upper side. The bus ring 105 is positioned such that the annular portion 511 of the outer clip 151 is disposed inside the bus-ring inserting portion 418 of each division core 104. Further, the outer circumferential surface of each surrounding portion 512 of the bus ring 105 is positioned between a pair of retainers 417 in the circumferential direction. In this case, the wire locking portions 414 of the division cores 104 are interposed between the side walls 512b of the surrounding portions 512, such that the wire locking portions 414 oppose the end portions of the opened side plates 433 and 434 of the low-voltage terminal boxes 143 from the outer side in the radial direction.

Therefore, on the division cores 104, the terminal accommodating portions 106 having a predetermined volume (see FIG. 14) are independently formed for each division core 104 by the wire locking portions 414, the low-voltage terminal boxes 143, and the surrounding portions 512. In each accommodating portions 106, the coil engagement portion 542 of the power supply terminal 154 shown in FIGS. 12 and 14 is engaged with the high-voltage-side end portion 421 of the coil 142 hung between the wire locking portions 414, and is fixed by fusing, caulking, welding, or the like.

Next, sensor brackets 160 (an example of an attachment member) according to the present embodiment will be described in detail mainly with reference to FIGS. 15 to 23. The sensor brackets 160 are members for fixing a temperature measuring portion of a thermistor 161 (an example of a first sensor) for measuring a temperature of the oil stored in the case 3 and the front case 6 shown in FIG. 2 to an oil temperature measurement point (an example of a first position), and fixing a temperature measuring portion of a thermistor 166 (an example of a second sensor) for measuring a temperature of the coil 142 wound around each of two adjacent division cores 104 to a coil temperature measurement point (an example of a second position).

Specifically, as shown in FIG. 3, the oil temperature sensor 162 for measuring the oil temperature is disposed on the lower side in the direction of gravity in a mounted state of the actual stator 22 which is the oil temperature measurement point. The oil temperature sensor 162 is not limited to the position shown in FIG. 3, but may be disposed at any position such that the temperature measuring portion of the thermistor element 161 is soaked in the oil.

Figure 15:
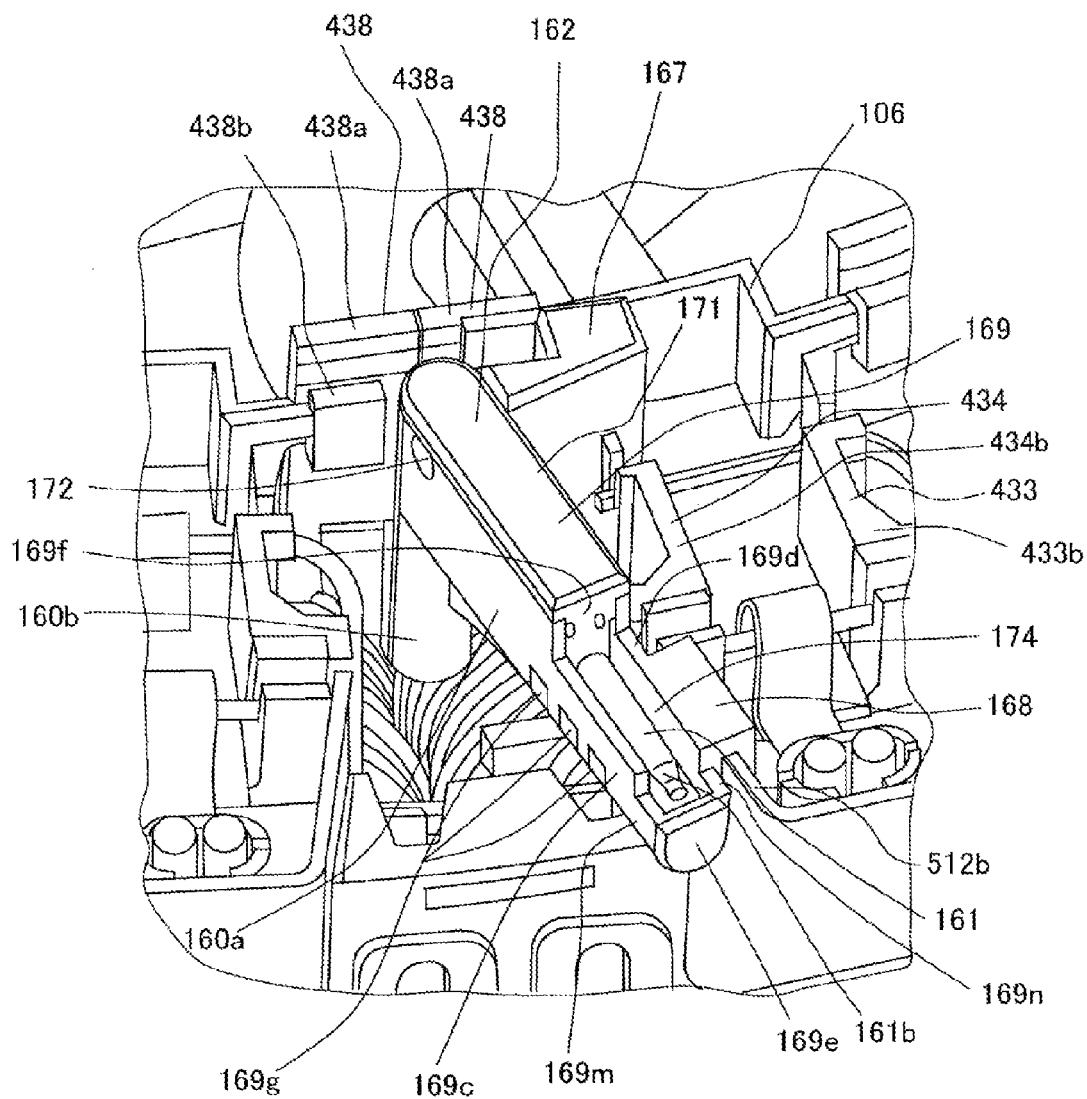
FIG. 15 is a perspective view illustrating a portion of a stator on which a sensor bracket accommodating an oil temperature sensor is attached.

Further, the coil temperature sensor 165 for measuring the temperature of the coil 142 is at a position rotated about 180 degrees from the attachment position of the oil temperature sensor 162 along the circumference of the stator 22. The attachment position of the coil temperature sensor 165 is not limited to the position shown in FIG. 3, but may be disposed at an optimal position appropriately selected. FIG. 15 is a perspective view illustrating a state in which the oil temperature sensor 162 is fixed to a terminal accommodating portion 106, and FIG. 16 is a perspective view illustrating a state in which the coil temperature sensor 165 is fixed to a terminal accommodating portion 106.

The sensor brackets 160 are made of aromatic nylon or a polyphenylene sulfide resin; however, the sensor brackets 160 are limited thereto. Each sensor bracket 160 includes a first holding portion 160a for holding the thermistor 161 for measuring the oil temperature, a second holding portion 160b for holding the thermistor 166 for measuring the coil temperature, which is perpendicular to the first holding portion 160a, and a first engagement portion 167 and a second engagement portion 168 which are engaged with a portion of a terminal accommodating portion 106 from the outer side of the terminal accommodating portion 106 such that the sensor bracket 160 is fixed. Specifically, the first engagement portion 167 is engaged with the side plate 434 (an example of a side wall) of the low-voltage terminal box 143 from the outer side, and is engaged with the low-voltage-terminal mounting portion 437 and the conductive-wire holding portion 438. The second engagement portion 168 is engaged with the side wall 512b of the high-voltage-terminal surrounding portion 512 from the outer side.

Figure 20:
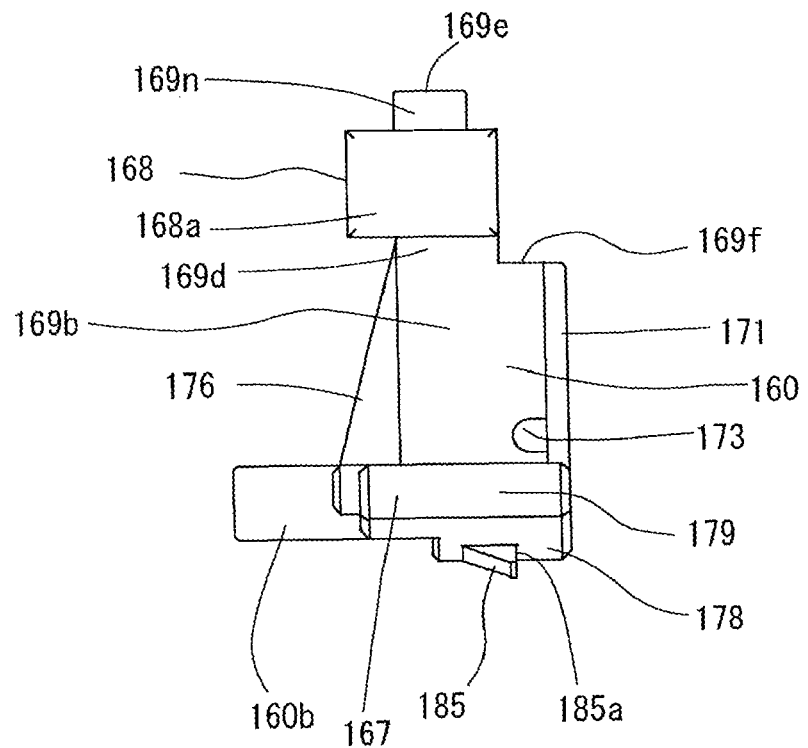
FIG. 20 is a view illustrating the sensor bracket shown in FIG. 17, as seen along an arrow Q.
Figure 21:
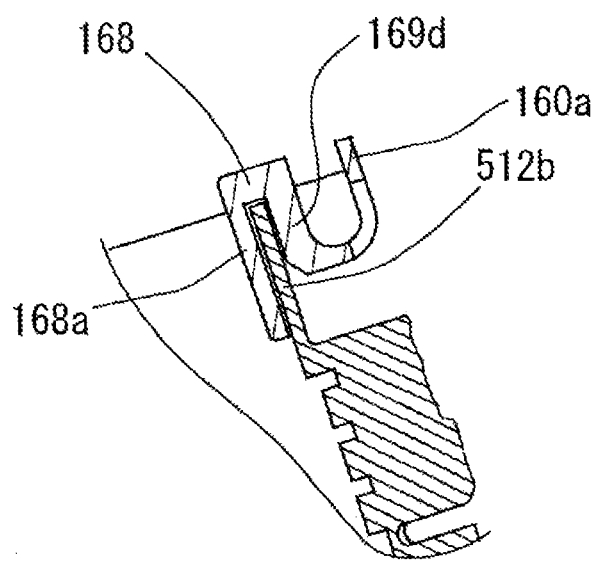
FIG. 21 is a cross-sectional view taken along a line 21-21 of FIG. 17.

The first holding portion 160a extends outward in the radial direction of the stator 22 in the attached state in the present embodiment. As shown in FIG. 21, the first holding portion 160a has an approximately U-shaped section perpendicular to the extension direction. As shown in FIGS. 15 and 16, on an accommodating portion 169 extending up to about the middle of the first holding portion 160a, a L-shaped lid member 171 is provided to cover an opening of a U-shaped section of the accommodating portion 169. In the approximately U-shaped section of the accommodating portion 169, in side walls 160a, notch holes 172 are provided to allow the conductive wire of the thermistor 161 accommodated in the first holding portion 160a to be drawn out. As shown in FIG. 20, in side walls 169b, notch holes 173 are provided to allow the conductive wire 166a of the thermistor 166 accommodated in the second holding portion 160b to be drawn out.

Figure 16:
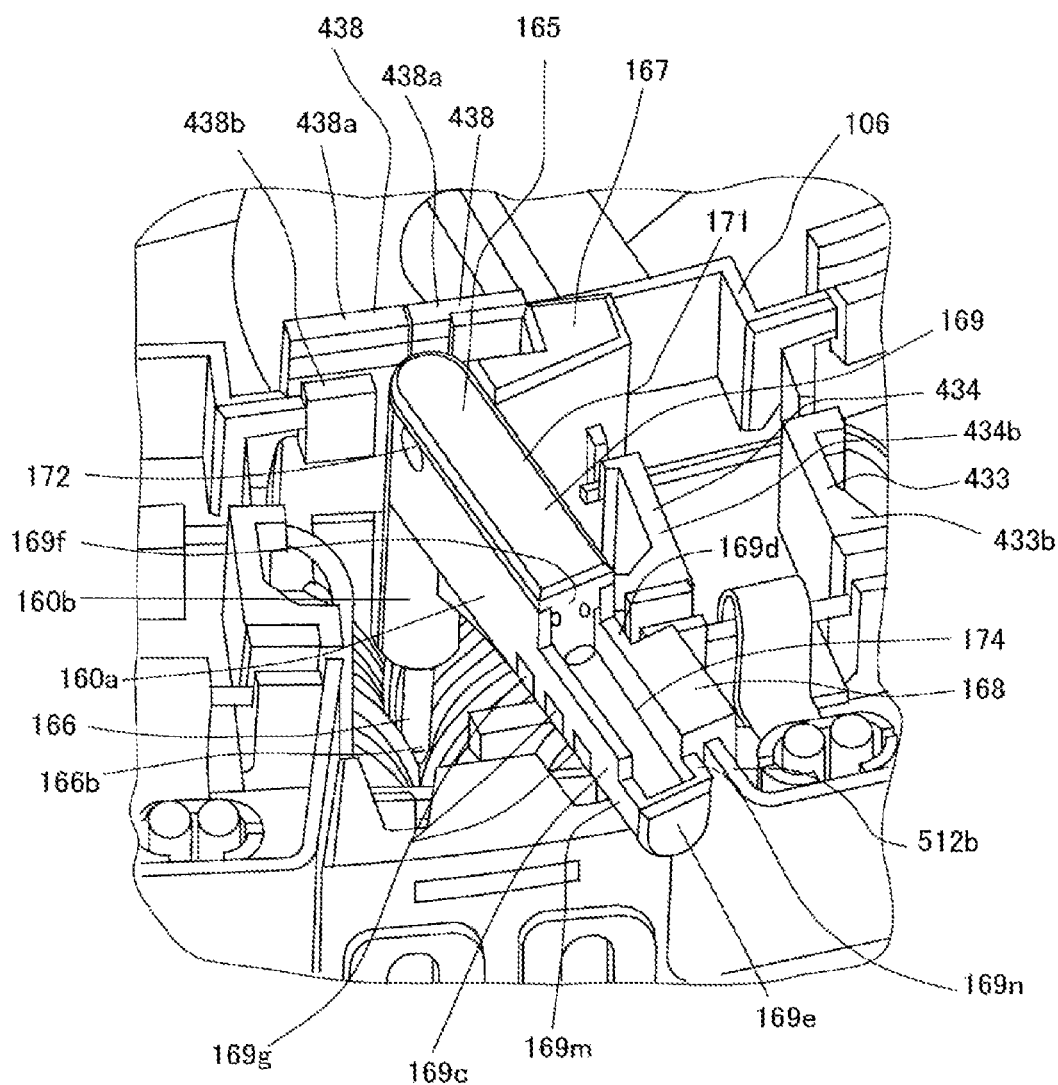
FIG. 16 is a perspective view illustrating a portion of the stator on which a sensor bracket accommodating a coil temperature sensor is attached.

As shown in FIGS. 15 and 16, an exposed portion 174 is formed to be opened from an end surface 169f of the accommodating portion 169 up to the tip end portion of the first holding portion 160a. The exposed portion 174 allows the temperature measuring portion 161b of the front end of the thermistor 161 to be exposed when the first holding portion 160a is accommodated. The front end portion of the exposed portion 174 has stepped walls 169 and 169n having a height smaller than that of both side walls 169c and 169d of the exposed portion 174. The end portion of the walls 169 and 169n are closed by a front end wall 169e.

Further, in the present embodiment, three rectangular windows 169g are formed from the side walls 169c of a U-shaped groove of the exposed portion 174 up to a curvature portion which is the bottom surface such that the oil easily comes into contact with the thermistor 161. In this way, the temperature measuring portion 161b of the thermistor 161 is positioned at the oil temperature measurement point.

Figure 18:
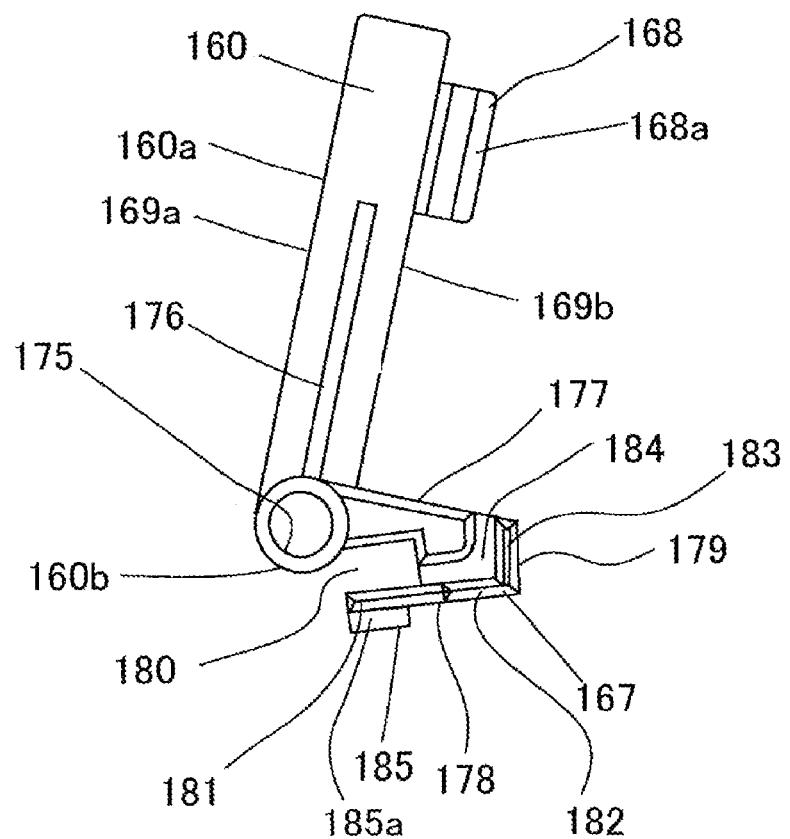
FIG. 18 is a view illustrating the sensor bracket shown in FIG. 17, as seen from the lower side.
Figure 19:
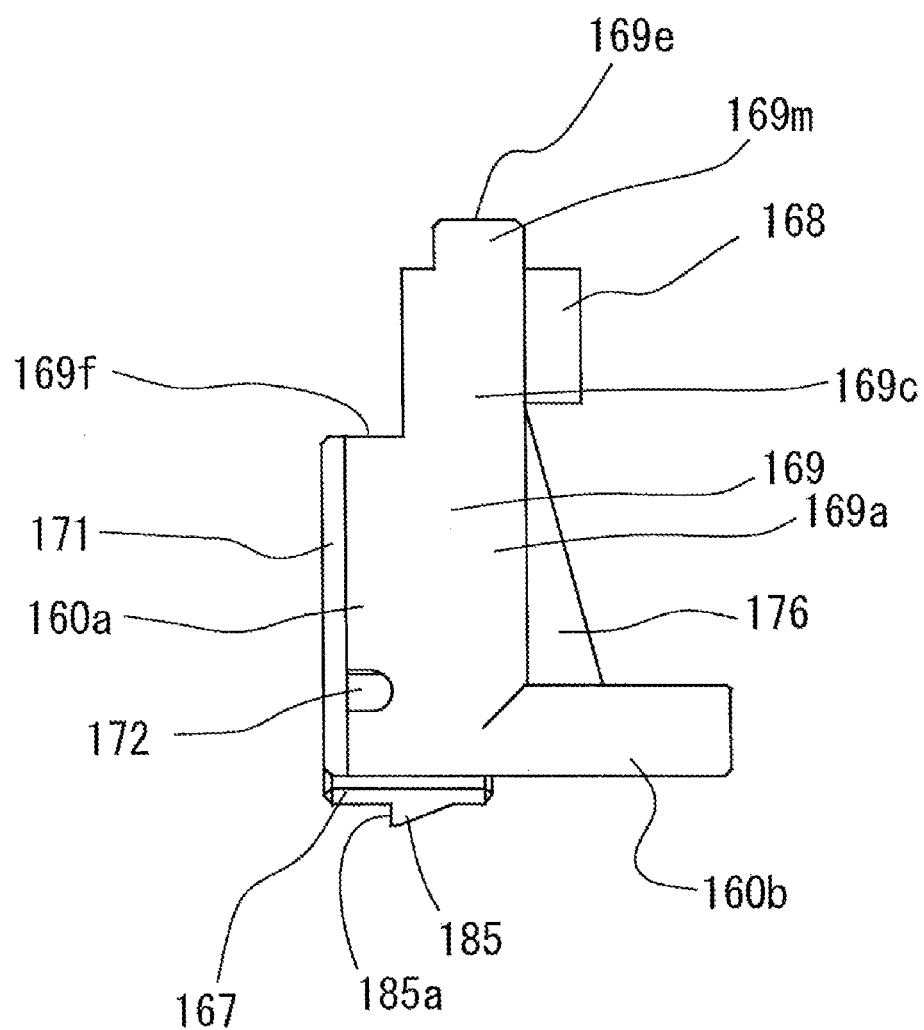
FIG. 19 is a view illustrating the sensor bracket shown in FIG. 17, as seen along an arrow P.

As shown in FIG. 18, the second holding portion 160b is cylindrically formed to have an inner circumferential hole 175 and the center of the cylinder extends approximately in parallel to the rotation axis of the rotor 21 in the attached state of the present embodiment. A plate-shaped rib 176 extends for increasing connection strength from a connected portion of the second holding portion 160b with the first holding portion 160a toward the front end portion of the sensor bracket 160. As shown in FIG. 16, from the end surface of the second holding portion 160b, the temperature measuring portion 166b of the thermistor 166 held in the inner circumferential hole 175 of the second holding portion 160b is exposed slightly, so as to be positioned at the coil temperature measurement point.

Figure 23:
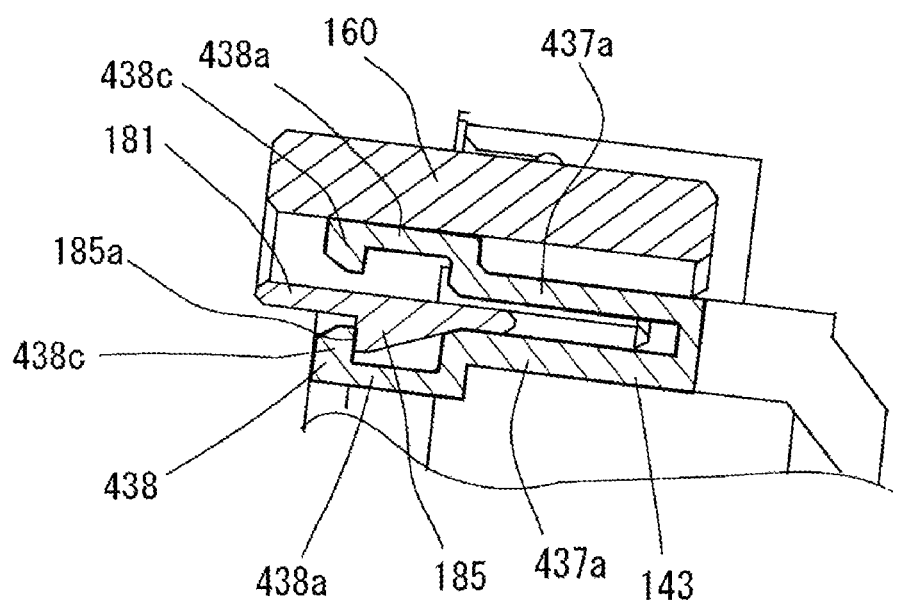
FIG. 23 is a cross-sectional view taken along a line 23-23 of FIG. 17.

In a bottom view of the thermistor 160 of FIG. 18, on the right side of the intersection of the first holding portion 160a and the second holding portion 160b, the first engagement portion 167 is provided. In the bottom view of FIG. 18, the first engagement portion 167 includes a first wall 177 extending in a tangential direction to the outer circumference of the cylindrical second holding portion 160b so as intersect with the side wall 169b, a second wall 178 forming a predetermined angle with the first wall 177 and disposed on the inner circumferential side relative to the first wall 177, and a third wall 179 formed to be connected to the first wall 177 and the second wall 178 and be in parallel to the side wall 434c of the low-voltage terminal box 143 in the attached state. Further, the first engagement portion 167 has a rectangular opening 180 formed by cutting to be opened from a trapezoidal shape surrounded by the first wall 177, the second wall 178, and the third wall 179 outward in the circumferential direction of the stator 22. Furthermore, between the opening 180 and the second wall 178, a first engagement wall 181 is formed. On a surface of the first engagement wall 181 on the inner circumferential side of the stator 22, an engagement claw 185 is formed. The engagement claw 185 has a planar portion 185a formed in the front side in FIG. 18. When the sensor bracket 160 is attached to the low-voltage terminal box 143 as shown in FIG. 23, the first engagement wall 181 is engageably inserted between the wall 438b and the wall 438a of the conductive-wire holding portion 438, and between the pinching wall 437a and the pinching wall 437a of the terminal mounting portion 437, and the engagement claw 185 is engaged with the claw portion 438c of the wall 438a, such that the sensor bracket 160 is retained.

Figure 22:
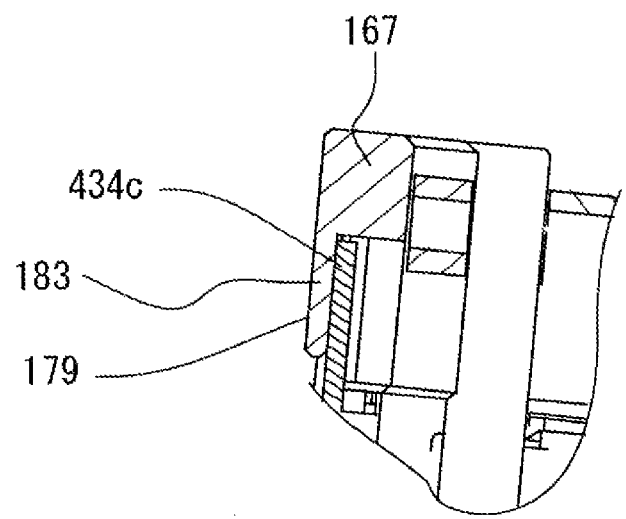
FIG. 22 is a cross-sectional view taken along a line 22-22 of FIG. 17.

Further, as shown in FIG. 18, a L-shaped groove 184 having a L shape in plan view is engraved between the second wall 178 and the third wall 179 such that a second engagement wall 182 and a third engagement wall 183 are formed. Further, as shown in FIG. 22, when the sensor bracket 160 is attached to the low-voltage terminal box 143, a curved portion 439 (see FIG. 5) formed by the side wall 434c of the low-voltage terminal box 143 and the pinching wall 437a of the terminal mounting portion 437 is engaged with the L-shaped groove 184, such that the sensor bracket 160 is positioned.

Figure 17:
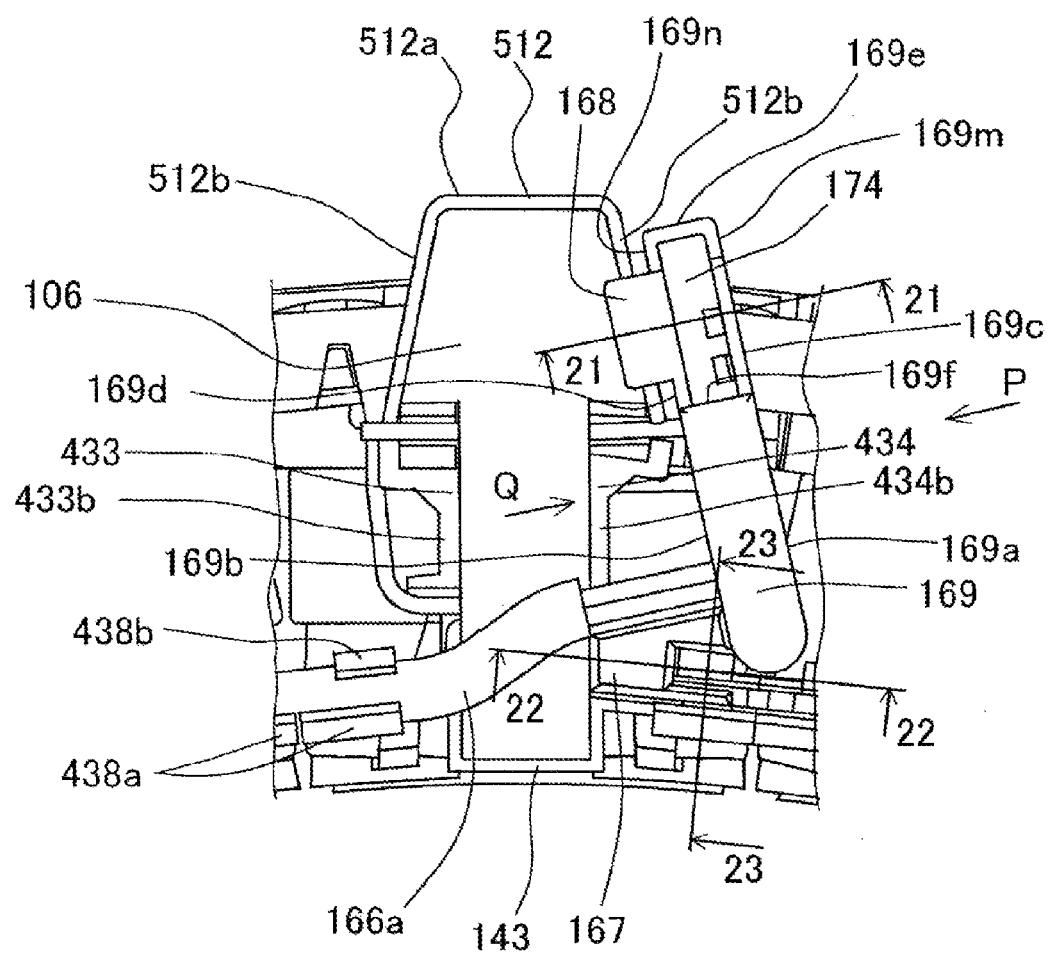
FIG. 17 is a partial plan view of the portion of the stator on which the sensor bracket is attached, as seen in the rotation axis direction.

The second engagement portion 168 is provided on the left side of the exposed portion 174 of the sensor bracket 160 in the plan view of FIG. 17. As shown in FIG. 21, the second engagement portion 168 includes an engagement wall 168a extending from the upper end of the side wall 169d of the exposed portion 174 in a direction perpendicular to the side wall 169d to be farther away from the side wall 169d, and suspended to be parallel to the side wall 169d. A gap between the side wall 169d and the engagement wall 168a is formed slightly larger than the thickness of the side wall 512b of the surrounding portion 512, and the side wall 512b is engaged between the engagement wall 168a of the side wall 169 of the exposed portion 174 forming the second engagement portion 168, such that the sensor bracket 160 is positioned.

The sensor bracket 160 is configured as described above. Therefore, the oil temperature sensor 162 is easily and firmly fixed to a portion of the outer side of the terminal accommodating portion 106 such that the temperature measuring portion 161b of the thermistor 161 is positioned at the oil temperature measurement point (an example of a first position). Therefore, the positioning is accurately performed. Further, the coil temperature sensor 165 is easily fixed to a portion of the terminal accommodating portion 106 on the outer side such that the temperature measuring portion 166b of the thermistor 166 is positioned at the coil temperature measurement point (an example of a second position) between adjacent terminal accommodating portions 106. Therefore, the positioning is accurately performed.

Further, as described above, the oil temperature sensor 162 for measuring the oil temperature is disposed on the lower side in the direction of gravity in the mounted state of the actual stator 22 which is the oil temperature measurement point (an example of a first position) (see FIG. 3). Further, in the present embodiment, the conductive wire 161a of the thermistor 161 of the oil temperature sensor 162 is drawn from the notch hole 172 of the sensor bracket 160 and is routed toward the left side in the circumferential direction of the stator 22 in FIG. 3. In this case, the conductive wire 161a is held by a pair of conductive-wire holding portions 438 of each terminal accommodating portion 106 provided at the left side of the oil temperature sensor 162 in a state shown by an alternate long and two short dashes line in FIG. 7, and is drawn from the height of the approximate center of the stator 22 outward in the radial direction of the stator 22.

Further, the coil temperature sensor 165 for measuring the temperature of the coil 142 is at a position (which is the coil temperature measurement point) rotated about 180 degrees from the attachment position of the oil temperature sensor 162 along the circumference of the stator 22 in FIG. 3. Furthermore, in the present embodiment, the conductive wire 166a of the thermistor 166 of the oil temperature sensor 165 is drawn from the notch hole 173 of the sensor bracket 160 and is routed toward the left side in the circumferential direction of the stator 22 in FIG. 3. In this case, the conductive wire 166a is held by the left conductive-wire holding portion 438 of a pair of conductive-wire holding portions 438 of a fixed terminal accommodating portion 106 in FIG. 3, is held by a pair of conductive-wire holding portions 438 of each terminal accommodating portion 106 provided on the left side of the oil temperature sensor 162, and is drawn from the height of the approximate center of the stator 22 outward in the radial direction of the stator 22.

As described above, the conductive wires 161a and 166a of the oil temperature sensor 162 and the coil temperature sensor 165 is drawn from the height of the approximate center of the stator 22 outward in the radial direction of the stator 22, and are connected to one connector (not shown). Therefore, it is possible to reduce the number of connectors and the cost, as compared to a case where the oil temperature sensor 162 and the coil temperature sensor 7b are separately routed.

The connection portions of the high-voltage-side end portions 421 of the coils 142 and the power supply terminals 154 and the connection portions of the low-voltage-side end portions 422 and the neutral terminal 144 are accommodated in the terminal accommodating portions 106, and then the terminal accommodating portions 106 are filled with an insulating resin material as a bonding material. Then, the filled insulating resin material hardens so as to fix the bobbins 141, the low-voltage terminal boxes 143, the temperature sensors 162 and 165, and the bus ring 6, thereby completing the stator 22.

Next, operations of the electric motor 20 and the vehicle drive device 1 using the electric motor 20 will be described. Examples of a case where the electric motor 20 and the vehicle drive device 1 operate in the vehicle of the present embodiment include a case where the hydraulic pressure of the hydraulic chamber 46 of the clutch device 40 is first released and thus the clutch device 40 is engaged such that the engine 10 and the electric motor 20 of the vehicle drive device 1 operate at the same time. Further, there is a case where the hydraulic pressure is supplied to the hydraulic chamber 46 of the clutch device 40 and thus the engagement of the clutch device 40 is released, such that only the electric motor 20 drives the vehicle as a drive source. Even in any case, the operations of the electric motor 20 and the vehicle drive device 1 are the same, and thus will be described at the same time.

If the controller 70 issues a drive command for the electric motor 20 of the vehicle drive device 1, a current flows from a battery (not shown) to the external terminals 155u, 155v, and 155w of the stator 22. If power is applied from the external terminals 155u, 155v, and 155w to the coils 142 having the individual phases through the segment wires 153u, 153v, and 153w, a rotating magnetic field can be generated such that the rotor 21 rotates and the electric motor 20 functions as a drive source. Then, the power increases at a predetermined torque ratio by the converter 2, and is transmitted to the input shaft of the automatic transmission 5, such that the vehicle runs.

In this case, if the electric motor 20 to which a large amount of current is continuously driven, the coils 142 of the stator 22 generate heat. Then, in the present embodiment, in order to cool the coils 142 of the stator 22 generating heat, the cooling oil is scattered to the coils 142 of the stator 22 such that the coils 142 is cooled. The cooling oil is stored in a lower portion of the case 3 and the front case 6 (corresponding to the reservoir 72) relative to the stator 32 in the actual mounted state, and a lower portion of the stator is slightly soaked in the oil. In this case, the temperature measuring portion 162b of the oil temperature sensor 162 fixed to the stator 22 is soaked in the stored oil.

The oil is supplied into the hydraulic chamber 46 of the clutch device 40 by driving of the electric oil pump 60, or is leaked from the oil hole 35 of the connection portion 32a of the inner circumferential opening 32 so as to be attached to the annular portion 41c of the input shaft 41. The oil attached to the annular portion 41c is scattered to the friction plates 42 and the separate plates 43 of the clutch device 40, and the rotor 21 and the stator 22 of the electric motor 20, so as to cool each portion, and then falls below the stator 22 to be restored in the case 3 and the front case 6, such that the lower portion of the stator 22 is soaked in the oil. Therefore, the oil cools the soaked portion of the stator 22. As described above, since the oil has a cooling function of cooling each portion, if there is abnormal heat generation in a cooled, the temperature of the oil may rise. Further, for example, if the temperature of the coils 142 of the stator 22 with a portion soaked in the oil rises such that the oil temperature rises over a predetermined value, the cooling performance is significantly degraded, and the cooling performance on each portion, particularly, the stator 22 is greatly influenced.

Considering this situation, in the present embodiment, it is possible to measure the oil temperature always at the same position by the thermistor 161 which is the temperature sensor held at a predetermined of the stator 22 by the sensor bracket 160. Therefore, it is possible to reliably and accurately detect a rise in temperature of the oil, and to quickly take measurements such as stopping of the system if abnormality is detected, such that the reliability is improved.

Further, since it is possible to simultaneously measure the temperature of the coils 142 of the stator 22 always at the same position by the thermistor 166 which is a temperature sensor held by the sensor bracket 160, even in this case, it is possible to reliably and accurately detect a rise in temperature of the oil, and to quickly take measurements such as stopping of the system if abnormality is detected, such that the reliability is further improved.

In the present embodiment, the oil temperature sensor 162 and the coil temperature sensor 163 are provided at the stator 22; however, only one of the oil temperature sensor 162 and the coil temperature sensor 163 may be provided. Even in this case, commensurate effects can be achieved.

Further, in the present embodiment, the first engagement portion 167 of the sensor bracket 160 is engaged with the side wall 434 of the low-voltage terminal box 143 from the outer side, and is engaged with the conductive-wire holding portion 438 and the low-voltage-terminal mounting portion 437 holding the low-voltage-side terminal. Furthermore, the second engagement portion 168 is engaged with the side wall 512*b* of the high-voltage-terminal surrounding portion 512, so as to fix the sensor bracket 160. However, the present invention is not limited to thereto. As long as the sensor bracket 160 is disposed between adjacent terminal accommodating portions 106 and is fixed to a portion of the terminal accommodating portions 106 on the outer side of the terminal accommodating portions 106, and the temperature measuring portions 161*b* and 166*b* of the thermistors 161 and 166 are positioned at the oil temperature measurement point (an example of a first position) and the coil temperature measurement point (an example of a second position), the sensor bracket 160 may be engaged with any portion of the terminal accommodating portions 106. Even in this case, the same effects can be achieved.

Further, in the present embodiment, the first engagement portion 167 and the second engagement portion 168 of the sensor bracket 160 are engaged with the terminal accommodating portion 106, so as to fix the temperature sensors 162 and 165. However, the present invention is not limited thereto. Only one of the first engagement portion and the second engagement portion may be engaged with the terminal accommodating portion 106, so as to fix the temperature sensors 162 and 165. Even in this case, commensurate effects can be expected. Also, the temperature sensors may be fixed by not only the engagement of the first engagement portion 167 and the second engagement portion 168 with the terminal accommodating portion 106 but also bonding.

In the present embodiment, the sensor bracket 160 includes the first holding portion 160*a* and the second holding portion 160*b*. However, the present invention is not limited thereto. The sensor bracket 160 may include at least one of the first holding portion 160*a* and the second holding portion 160*b*. Even in this case, the same effects can be achieved.

As apparent from the above description, according to the present embodiment, at the sensor bracket 160 (an example of an attachment member) of the electric motor 20, the first holding portion 160*a* is formed to hold the thermistor 161 (an example of a first sensor) which is a temperature sensor for measuring the temperature of the oil stored in the case 3 and the front case 6 at the oil temperature measurement point (an example of a first position). Further, the second holding portion 160*b* is formed to hold the thermistor 166 (an example of a second sensor) which is a temperature sensor for measuring the temperature of the coils at the coil temperature measurement point. Furthermore, the sensor bracket 160 is fixed to a portion of adjacent terminal accommodating portions 106 configuring the stator 22 fixed to the case 3 from the outer side of the terminal accommodating portions 106, such that the thermistors 161 and 166 are positioned at the oil temperature measurement point and the coil temperature measurement point between the terminal accommodating portions 106. It is possible to accurately position the temperature measuring portions of the thermistors 161 and 166 at the oil temperature measurement point and the coil temperature measurement point in a stable state only by easily fixing the sensor brackets 160 of the electric motor 20 and having the thermistors 161 and 166 to a portion of the terminal accommodating portions 106 as described above. Further, since it is not required to form fixing portions for fixing the thermistors 161 and 166 in a mold filled in the terminal accommodating portion 106, it is possible to easily perform the attachment of the thermistors 161 and 166 in a short time at low cost.

Also, according to the present embodiment, the first engagement portion 167 of the sensor bracket 160 of the electric motor 20 is engaged with the side wall 434 of the low-voltage terminal box 143 (an example of a supporting member) from the outer side, and is engaged with the low-voltage-terminal mounting portion 437 (an example of a mounting portion) holding the low-voltage-side terminal and the conductive-wire holding portion 438 formed on the end portion side relative to the low-voltage-terminal mounting portion 437 and holding the conductive wire of the thermistor 161 or 166, such that the sensor bracket 160 is fixed to the low-voltage-side end portion 422 attached to the division cores 104 which are core assemblies. Therefore, it is possible to accurately position the thermistor 161 or 166 at the coil temperature measurement point of the coils 141 wound around the division cores 104. Further, it is possible to fix the sensor bracket 160 at low cost by the conductive-wire holding portion 438 formed to hold the conductive wire of the thermistor 161 or 166.

According to the present embodiment, the second engagement portion 168 of the sensor bracket 160 of the electric motor 20 is engaged with the side wall 512 of the high-voltage-terminal surrounding portion 512 of the bus ring 105, such that the sensor bracket 160 is firmly fixed to the terminal accommodating portion 106. Therefore, it is possible to accurately position the temperature measuring portions of the thermistors 161 and 166 (an example of temperature sensors) at the oil temperature measurement point and the coil temperature measurement point in a stabler state.

In the present embodiment, the vehicle is a hybrid vehicle including the case 3, the input shaft 2 supported by the front case 6 to be rotatable and rotatably connected to the engine 10, and the clutch device 8 engageably and disengageably connecting the input shaft 2 and the output shaft 4, on the same axis as that of the output shaft 26. Therefore, the drive device 1 for a vehicle using the electric motor 20 can accurately measure at least one of the temperature of the oil stored in the case 3 and the front case 6, and the temperature of the coil 142 of the core unit 103 of the electric motor 20 requiring high power.

Either the connection portions of the high-voltage-side end portions 421 of the coils 142 and the power supply terminals 154 or the connection portions of the low-voltage-side end portions 422 and the neutral terminal 144 may be accommodated in the terminal accommodating portions 106, and then the terminal accommodating portions 106 may be filled with the insulating resin material.

Also, for each division core 104, a plurality of terminal accommodating portions 106 may be formed, the connection portions of the high-voltage-side end portions 421 of the coils 142 and the power supply terminals 154 and the connection portions of the low-voltage-side end portions 422 and the neutral terminal 144 may be accommodated in each terminal accommodating portion 106, and then the engagement portions 167 and 168 (an example of fixing portions) of the sensor bracket 160 may be engaged with each terminal accommodating portion 106, such that the sensor bracket 160 is fixed.

The transmission of the present embodiment is not limited to the planetary gear type automatic transmission generally used as a transmission, but may be a continuously variable transmission or a synchronous mesh-type transmission generally used as a manual transmission.

Further, the present invention is not limited to the hybrid vehicle, but may be applied to an electric vehicle having the electric motor 20.

What is claimed is:

1. An electric motor comprising:
    a core unit which includes: a plurality of core assemblies annually fixed to a case, each core assembly wound with a coil; and a first terminal connecting one end portion of each coil with each other;
    an annular bus ring which is attached to the core unit and holds a plurality of power supply lines, the bus ring including a first surrounding portion which opposes each of the core assemblies and surrounds a second terminal connecting the other end portion of each coil with any one of the power supply lines;
    a plurality of supporting members which are attached to the core assemblies, respectively, each supporting member including a second surrounding portion which surrounds a corresponding first terminal, wherein each supporting member and a corresponding first surrounding portion form a terminal accommodating portion having a box shape with a bottom;
    an attachment member which includes at least one of a first holding portion and a second holding portion, wherein the first holding portion is for holding a first sensor for measuring a temperature of an oil stored in the case at a predetermined first position, and the second holding portion is for holding a second sensor for measuring a temperature of the coils at a predetermined second position;
    wherein the attachment member is fixed to one of the supporting members such that the first or the second sensor is positioned at a corresponding one of the first position and the second position between adjacent terminal accommodating portions;
    wherein each of the supporting members includes: a mounting portion for holding a corresponding first terminal, and a conductive-wire holding portion for holding a conductive wire of the first or second sensor at a tip end side relative to the mounting portion; and
    wherein the attachment member includes a first engagement portion which is engaged with a side wall of a corresponding supporting member from an outer side, and is engaged with corresponding mounting portion and conductive-wire holding portion, to hold the attachment member.

2. The electric motor according to claim 1,
    wherein the attachment member includes a second engagement portion which is engaged with a side wall of a corresponding first surrounding portion from an outer side.

3. A vehicle drive device comprising:
    a first case;
    an output shaft which is supported by the first case to be rotatable around a rotation axis line; and
    an electric motor which includes: a rotor integrally connected with the output shaft; and a stator fixed to the first case,
    wherein the stator includes:
        a core unit which includes: a plurality of core assemblies annually fixed to a second case, each core assembly wound with a coil; and a first terminal connecting one end portion of each coil with each other;
        an annular bus ring which is attached to the core unit and holds a plurality of power supply lines, the bus ring including a first surrounding portion which opposes each of the core assemblies and surrounds a second terminal connecting the other end portion of each coil with any one of the power supply lines;
        a plurality of supporting members which are attached to the core assemblies, respectively, each supporting member including a second surrounding portion which surrounds a corresponding first terminal, wherein each supporting member and a corresponding first surrounding portion form a terminal accommodating portion having a box shape with a bottom;
        an attachment member which includes at least one of a first holding portion and a second holding portion, wherein the first holding portion is for holding a first sensor for measuring a temperature of an oil stored in the first case at a predetermined first position, and the second holding portion is for holding a second sensor for measuring a temperature of the coils at a predetermined second position,
            wherein the attachment member is fixed to one of the supporting members such that the first or the second sensor is positioned at a corresponding one of the first position and the second position between adjacent terminal accommodating portions;
        wherein each of the supporting members includes: a mounting portion for holding a corresponding first terminal, and a conductive-wire holding portion for holding a conductive wire of the first or second sensor at a tip end side relative to the mounting portion; and
            wherein the attachment member includes a first engagement portion which is engaged with a side wall of a corresponding supporting member from an outer side, and is engaged with corresponding mounting portion and conductive-wire holding portion, to hold the attachment member.

4. The vehicle drive device according to claim 3, further comprising:
    an input shaft which is supported by the second case on an axis same as that of the output shaft to be rotatable, and is connected to an engine; and
    a clutch device which engageably and disengageably connects the input shaft and the output shaft.

5. The electric motor according to claim 1,
    wherein in each of the supporting members, the conductive-wire holding portion includes: a first wall; and a second wall which opposes the first wall and having a width smaller than that of the first wall in a circumferential direction of the stator, and wherein the first wall is formed at a tip end portion of a pinching wall which configures an inner circumferential side of the stator, and the second wall is formed at a tip end portion of a pinching wall which configures an outer circumferential side of the stator.

6. The electric motor according to claim 1, wherein each of the first surrounding portion includes: a standing wall portion extending in a circumferential direction of the stator; and side walls extending from both edge portions of the standing wall toward an inner side in a radial direction of the stator.

7. The electric motor according to claim 1, wherein each of the supporting members includes: a bottom plate portion; a rear wall provided on a rear end portion of the bottom plate portion; and a pair of side plates standing from side end portions of the bottom plate portion, and the rear wall and the pair of side plates configure the second surrounding portion thereof.

8. The electric motor according to claim 1, wherein the attachment member integrally includes the first holding portion and the second holding portion which extends perpendicular to the first holding portion.

* * * * *